United States Patent
Park et al.

(10) Patent No.: US 11,567,863 B2
(45) Date of Patent: Jan. 31, 2023

(54) STORAGE DEVICE AND OPERATING METHOD THEREOF

(71) Applicant: SK hynix Inc., Gyeonggi-do (KR)

(72) Inventors: Sung Jin Park, Gyeonggi-do (KR); Jee Yul Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/194,727

(22) Filed: Mar. 8, 2021

(65) Prior Publication Data

US 2022/0066925 A1 Mar. 3, 2022

(30) Foreign Application Priority Data

Sep. 2, 2020 (KR) .................. 10-2020-0111848

(51) Int. Cl.
*G06F 12/02* (2006.01)
*G06F 3/06* (2006.01)
*G06F 12/0891* (2016.01)

(52) U.S. Cl.
CPC .......... *G06F 12/0246* (2013.01); *G06F 3/064* (2013.01); *G06F 3/0614* (2013.01); *G06F 3/0631* (2013.01); *G06F 3/0652* (2013.01); *G06F 3/0679* (2013.01); *G06F 12/0253* (2013.01); *G06F 12/0891* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 9,280,459 B2* | 3/2016 | Su | G06F 12/0253 |
| 2011/0264843 A1* | 10/2011 | Haines | G06F 12/0246 711/170 |
| 2013/0080689 A1* | 3/2013 | Jo | G06F 12/0246 711/E12.008 |
| 2014/0181434 A1* | 6/2014 | Chau | G06F 12/16 711/162 |
| 2015/0026389 A1* | 1/2015 | Li | G06F 12/0246 711/103 |
| 2015/0186055 A1* | 7/2015 | Darragh | G11C 16/3445 711/103 |
| 2015/0186072 A1* | 7/2015 | Darragh | G06F 3/0679 711/103 |
| 2015/0261671 A1* | 9/2015 | Chu | G06F 12/0246 711/103 |
| 2017/0286289 A1* | 10/2017 | Chu | G06F 12/0246 |

(Continued)

FOREIGN PATENT DOCUMENTS

KR 10-2013-0032155 4/2013
KR 10-2020-0033461 3/2020

*Primary Examiner* — Kevin Verbrugge
(74) *Attorney, Agent, or Firm* — IP & T Group LLP

(57) ABSTRACT

The present disclosure relates to a storage device and an operating method thereof. The storage device includes a memory device including write-completed blocks storing data and free blocks each containing no data and a memory controller controlling the memory device to perform a garbage collection operation to store valid data stored in a victim block, among the write-completed blocks, in one of the free blocks based on the number of map segments including mapping information between logical addresses and physical addresses of the valid data, and erase counts of the free blocks.

20 Claims, 19 Drawing Sheets

(56) References Cited

U.S. PATENT DOCUMENTS

| | | | | |
|---|---|---|---|---|
| 2018/0217769 A1* | 8/2018 | Nagahara | ........... | G11C 16/3418 |
| 2018/0341413 A1* | 11/2018 | Lai | ......................... | G06F 3/0679 |
| 2018/0365079 A1* | 12/2018 | Koch | ...................... | G06F 3/061 |
| 2019/0102291 A1* | 4/2019 | Zhou | ...................... | G06F 3/0659 |
| 2020/0097400 A1* | 3/2020 | Lee | ..................... | G06F 12/0253 |
| 2020/0133543 A1* | 4/2020 | Singh | ....................... | G06F 12/08 |
| 2020/0387447 A1* | 12/2020 | Byun | ....................... | G06N 5/04 |
| 2021/0216474 A1* | 7/2021 | Muchherla | .......... | G06F 11/3037 |

* cited by examiner

| LBA | PBA |
|---|---|
| LBA1 | PBA1 |
| LBA2 | PBA2 |
| LBA3 | PBA3 |
| LBA4 | PBA4 |
| LBA5 | PBA5 |
| LBA6 | PBA6 |
| LBA7 | PBA7 |
| LBA8 | PBA8 |
| LBA9 | PBA9 |
| LBA10 | PBA10 | seg1: LBA1–LBA2
seg2: LBA3–LBA4
seg3: LBA5–LBA6
seg4: LBA7–LBA8
seg5: LBA9–LBA10

| # BLK | Valid_Seg_Count | Erase_Count |
|---|---|---|
| BLK1 | 3 | 4 |
| BLK2 | 5 | 20 |
| BLK3 | 0 | 3 |
| ... | ... | ... |
| BLKz | 4 | 5 |

232b

| LBA | PBA | Valid/Invalid |
|---|---|---|
| LBA1 | PBA1 | Valid |
| LBA2 | PBA2 | Valid |
| LBA3 | PBA3 | Invalid |
| LBA4 | PBA4 | Invalid |
| LBA5 | PBA5 | Invalid |
| LBA6 | PBA6 | Valid |
| LBA7 | PBA7 | Invalid |
| LBA8 | PBA8 | Invalid |
| LBA9 | PBA9 | Invalid |
| LBA10 | PBA10 | Valid |

| Closed_BLK_V/S_Table ||
|---|---|
| Closed_BLK # | Valid_Seg_Count |
| Closed_BLK1 | 1 |
| Closed_BLK2 | 3 |
| Closed_BLK3 | 1 |
| Closed_BLK4 | 3 |
| Closed_BLK5 | 2 |
| Closed_BLK6 | 1 |
| Closed_BLK7 | 5 |
| Closed_BLK8 | 1 |
| Closed_BLK9 | 4 |
| Closed_BLK10 | 5 |
| Total 10 | Total 24 |

| Closed_BLK_V/S_Table ||
|---|---|
| Closed_BLK # | Valid_Seg_Count |
| Closed_BLK1 | 4 |
| Closed_BLK2 | 5 |
| Closed_BLK3 | 1 |
| Closed_BLK4 | 5 |
| Closed_BLK5 | 5 |
| Closed_BLK6 | 3 |
| Closed_BLK7 | 4 |
| Closed_BLK8 | 3 |
| Closed_BLK9 | 3 |
| Closed_BLK10 | 1 |
| Total 10 | Total 38 |

STORAGE DEVICE AND OPERATING METHOD THEREOF

CROSS-REFERENCE TO RELATED APPLICATION

The present application claims priority under 35 U.S.C. § 119(a) to Korean patent application number 10-2020-0111848, filed on Sep. 2, 2020, in the Korean Intellectual Property Office, the entire disclosure of which is incorporated by reference herein.

BACKGROUND

1. Technical Field

Various embodiments relate generally to an electronic device, and more particularly, to a storage device and an operating method thereof.

2. Related Art

A storage device is configured to store data in response to control of a host device such as a computer or a smartphone. A storage device may include a memory device storing data and a memory controller controlling the memory device. Generally, there are two types of memory devices: volatile memory devices and non-volatile memory devices.

A volatile memory device may retain data as long as power is being supplied, and may lose the stored data in the absence of power supply. Examples of volatile memory devices include Static Random Access Memory (SRAM), Dynamic Random Access Memory (DRAM), and the like.

A non-volatile memory device may not lose data even in the absence of power supply. Examples of non-volatile memory devices include Read Only Memory (ROM), Programmable ROM (PROM), Electrically Programmable ROM (EPROM), Electrically Erasable and Programmable ROM (EEPROM) and flash memory.

SUMMARY

Various embodiments of the present disclosure are directed to a storage device performing wear leveling in consideration of workload and a method of operating the storage device.

According to an embodiment, a storage device may include a memory device including write-completed blocks storing data and free blocks each containing no data and a memory controller controlling the memory device to perform a garbage collection operation to store valid data stored in a victim block, among the write-completed blocks, in one of the free blocks based on the number of map segments including mapping information between logical addresses and physical addresses of the valid data, and erase counts of the free blocks.

According to an embodiment, a storage device may include a memory device including a plurality of memory blocks; and a memory controller controlling the memory device to allocate a free block to store write data corresponding to a write request from a host, among free blocks each containing no data of the plurality of memory blocks, according to a size of data stored in the plurality of memory blocks and the number of map segments including mapping information between logical addresses and physical addresses of the data, and to store the write data in the free block in response to the write request.

According to an embodiment, a storage device may include a memory device including a plurality of memory blocks, which includes multiple write-completed blocks and one or more free blocks and a memory controller configured to determine an attribute of valid data stored in a victim block among the write-completed blocks, to select one of the free blocks based on the attribute of the valid data and erase counts of the free blocks and to move the valid data of the victim block into the selected free block.

BRIEF DESCRIPTION OF THE DRAWINGS

FIG. 5 is a diagram illustrating a map table, such as that of FIG. 4;

FIG. 6 is a diagram illustrating block information, such as that of FIG. 4;

FIG. 10 is a diagram illustrating another embodiment of block information, such as that of FIG. 4;

FIG. 12 is a diagram illustrating another embodiment of block information, such as that of FIG. 4;

DETAILED DESCRIPTION

Advantages and features of the present invention and methods for achieving them will be made clear from embodiments described below in detail with reference to the accompanying drawings. However, the invention may be embodied in different forms and should not be construed as limited to the embodiments set forth herein. Rather, these embodiments are provided so that this disclosure is thorough and complete, and fully conveys the scope of the embodiments to those skilled in the art. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
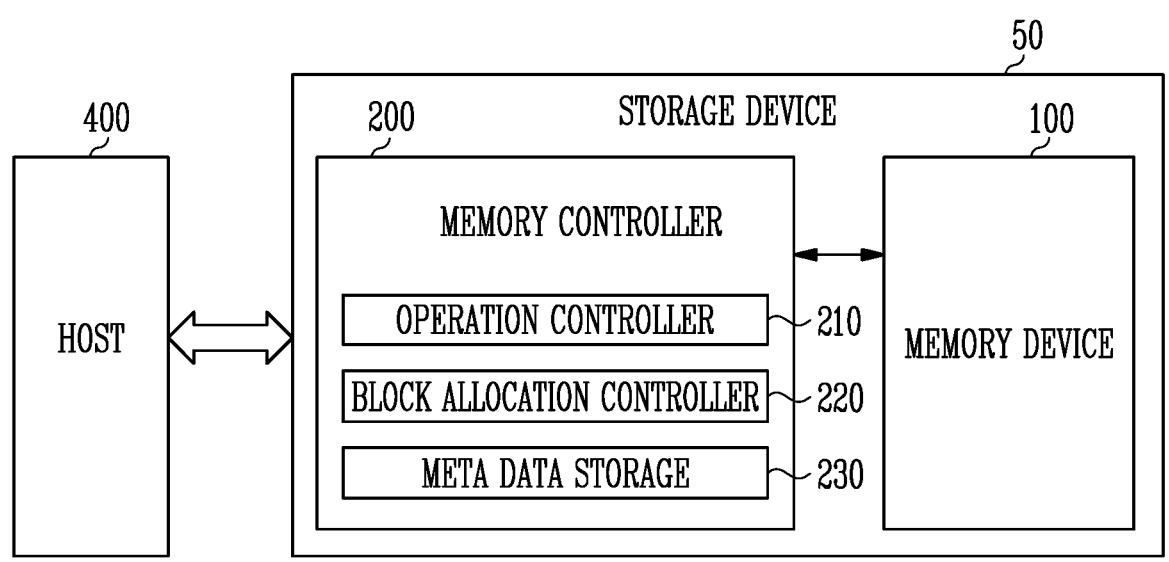
FIG. 1 is a diagram illustrating a storage device according to an embodiment of the present disclosure.

FIG. 1 is a diagram illustrating a storage device 50 according to an embodiment of the present disclosure.

Referring to FIG. 1, the storage device 50 may include a memory device 100 and a memory controller 200 controlling operations of the memory device 100. The storage device 50 may be configured to store data in response to control of a host 400. Examples of the storage device 50 may include a cellular phone, a smartphone, an MP3 player, a laptop computer, a desktop computer, a game player, a TV, a tablet computer, and/or an in-vehicle infotainment system.

The storage device 50 may be manufactured or configured as any of various types of storage devices according to a host interface corresponding to a communication method with the host 400. For example, the storage device 50 may be configured as a solid state drive (SSD), a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-e or PCIe) card type storage device, a compact flash (CF) card, a smart media card, and/or a memory stick.

The storage device 50 may be manufactured as any of various types of packages. For example, the storage device 50 may be manufactured as a package-on-package (POP), a system-in-package (SIP), a system-on-chip (SOC), a multi-chip package (MCP), a chip-on-board (COB), a wafer-level fabricated package (WFP), and/or a wafer-level stack package (WSP).

The memory device 100 may store data. The memory device 100 may operate in response to control of the memory controller 200. The memory device 100 may include a memory cell array including a plurality of memory cells storing data.

Each of the memory cells may be a single level cell (SLC) storing one bit of data, a multi-level cell (MLC) storing two bits of data, a triple level cell (TLC) storing three bits of data, or a quad level cell (QLC) storing four bits of data.

The memory cell array may include a plurality of memory blocks. Each of the memory blocks may include a plurality of memory cells. Each memory block may include a plurality of pages. According to an embodiment, a page may be a unit for storing data in the memory device 100 or reading data stored in the memory device 100.

A memory block may be a unit for erasing data. According to an embodiment, the memory device 100 may be embodied as or include a Double Data Rate Synchronous Dynamic Random Access Memory (DDR SDRAM), a Low Power Double Data Rate4 (LPDDR4) SDRAM, a Graphics Double Data Rate (GDDR) SDRAM, a Low Power DDR (LPDDR) SDRAM, a Rambus Dynamic Random Access Memory (RDRAM), a NAND flash memory, a vertical NAND flash memory, a NOR flash memory device, a resistive random access memory (RRAM), a phase-change random access memory (PRAM), a magnetoresistive random access memory (MRAM), a ferroelectric random access memory (FRAM), or a spin transfer torque random access memory (STT-RAM). In the description below, it is assumed that the memory device 100 is a NAND flash memory.

The memory device 100 may receive a command and an address from the memory controller 200 and access an area selected by the address in the memory cell array. That is, the memory device 100 may perform an operation corresponding to the command on the area selected by the address. For example, the memory device 100 may perform a write operation (program operation), a read operation, and an erase operation. During a program operation, the memory device 100 may program data into the area selected by the address. During a read operation, the memory device 100 may read data from the area selected by the address. During an erase operation, the memory device 100 may erase data from the area selected by the address.

The memory controller 200 may control general operations of the storage device 50.

When power is applied to the storage device 50, the memory controller 200 may execute firmware (FW). When the memory device 100 is a flash memory device, the firmware FW may include a host interface layer (HIL) controlling communication with the host 400, a flash translation layer (FTL) controlling communication between the host 400 and the memory device 100, and a flash interface layer (FIL) controlling communication with the memory device 100.

According to an embodiment, the memory controller 200 may receive data and a logical block address (LBA) from the host 400 and translate the logical block address LBA into a physical block address (PBA) indicating an address of memory cells in which data in the memory device 100 is stored. In the specification, a logical block address LBA may mean a "logical address" or a "logic address." In the specification, a physical block address PBA may mean a "physical address" or a "physic address."

The memory controller 200 may control the memory device 100 to perform a program operation, a read operation or an erase operation in response to a request from the host 400. During a program operation, the memory controller 200 may provide a write command, the physical block address PBA, and data to the memory device 100. During a read operation, the memory controller 200 may provide a read command and the physical block address PBA to the memory device 100. During an erase operation, the memory controller 200 may provide an erase command and the physical block address PBA to the memory device 100.

According to an embodiment, the memory controller 200 may generate and transfer a program command, an address, and data to the memory device 100 in the absence of a request from the host 400. For example, the memory controller 200 may autonomously provide the memory device 100 with commands, addresses and data for performing a read operation and program operations associated with performing wear leveling, read reclaim, and garbage collection.

According to an embodiment, the memory controller 200 may control at least two memory devices 100. The memory controller 200 may control the memory devices 100 according to an interleaving scheme so as to improve operation performance. According to the interleaving scheme, operations on at least two memory devices 100 may be controlled to overlap each other.

According to an embodiment, the memory controller 200 may include an operation controller 210, a block allocation controller 220 and a meta data storage 230.

The operation controller 210 may control an operation to be performed by the memory device 100. The operation controller 210 may control a program operation of storing write data provided in response to a write request from the host 400 in the memory device 100.

The operation controller 210 may control a program operation of storing data in the memory device 100 according to a write request caused by a background operation without a write request from the host 400.

The block allocation controller 220 may allocate a memory block to store data. According to an embodiment, the block allocation controller 220 may allocate a memory block to store data according to erase counts of memory blocks. The erase count of a memory block indicates the number of times an erase operation has been performed on that memory block. An erase count may be maintained for each memory block.

More specifically, the block allocation controller 220 may allocate a memory block having a relatively small erase count when storing hot data which is relatively frequently accessed. The block allocation controller 220 may allocate a memory block having a relatively large erase count when storing cold data which is relatively infrequently accessed. As a result, the memory controller 200 may manage wear leveling of the memory blocks by processing the write request provided by the host 400, or by performing a write operation caused by a background operation.

The block allocation controller 220 may predict workload of the host 400 in response to the write request provided by the host 400. For example, the block allocation controller 220 may predict workload on the basis of the amount of data stored in the memory device 100 and the number of map segments corresponding to valid data in the corresponding data. When a relatively large amount of data is stored and the number of map segments corresponding to the valid data is relatively small, the state of the workload of the host 400 may be considered to be a write request focused on writing sequential data (sequential write). On the other hand, when a relatively small amount of data is stored and the number of map segments corresponding to the valid data is relatively large, the state of the workload of the host 400 may be considered to be a write request focused on writing random data (random write).

More specifically, the sequential write may correspond to a write request for sequential logical addresses corresponding thereto, and the random write may correspond to a write request for non-sequential logical addresses corresponding thereto. In other words, the block allocation controller 220 may predict tendency of the write request of the host 400 on the basis of the amount of the stored data and a ratio of the number of map segments corresponding to the valid data with respect to all map segments.

According to an embodiment, when the workload of the host 400 is focused on sequential write, write data corresponding to the write request may be treated as cold data. On the other hand, when the workload of the host 400 is focused on random write, write data corresponding to the write request may be treated as hot data. Therefore, the block allocation controller 220 may allocate a memory block to store write data, which is input in response to the write request, according to the amount of the stored data and the ratio of the number of map segments corresponding to the valid data with respect to all map segments.

According to an embodiment, in response to a write operation caused by a background operation, the block allocation controller 220 may allocate a memory block according to the number of map segments corresponding to valid data to store. For example, when the number of map segments corresponding to the valid data stored in the victim block by garbage collection is relatively large, the block allocation controller 220 may allocate a memory block having a relatively large erase count. Alternatively, when the number of map segments corresponding to the valid data stored in the victim block by the garbage collection is relatively small, the block allocation controller 220 may allocate a memory block having a relatively small erase count. A method of allocating a memory block is described below in more detail with reference to FIGS. 4 to 13.

The meta data storage 230 may store meta data. The meta data may include a map table showing a mapping relationship between logical addresses and physical addresses of the data stored in the memory device 100.

According to an embodiment, the meta data may include block information about the memory blocks.

The block information may further include information about the number of map segments corresponding to valid data stored in each memory block and erase count information indicating an erase count of each memory block. According to an embodiment, the block information may further include block status information indicating a status of each memory block. The block status information may indicate whether a memory block is a write-completed block in which data has been completely stored, a free block containing no data, an open block in which data has not been completely stored, or a bad block.

The host 400 may communicate with the storage device 50 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and/or Load Reduced DIMM (LRDIMM) communication methods.

Figure 2:
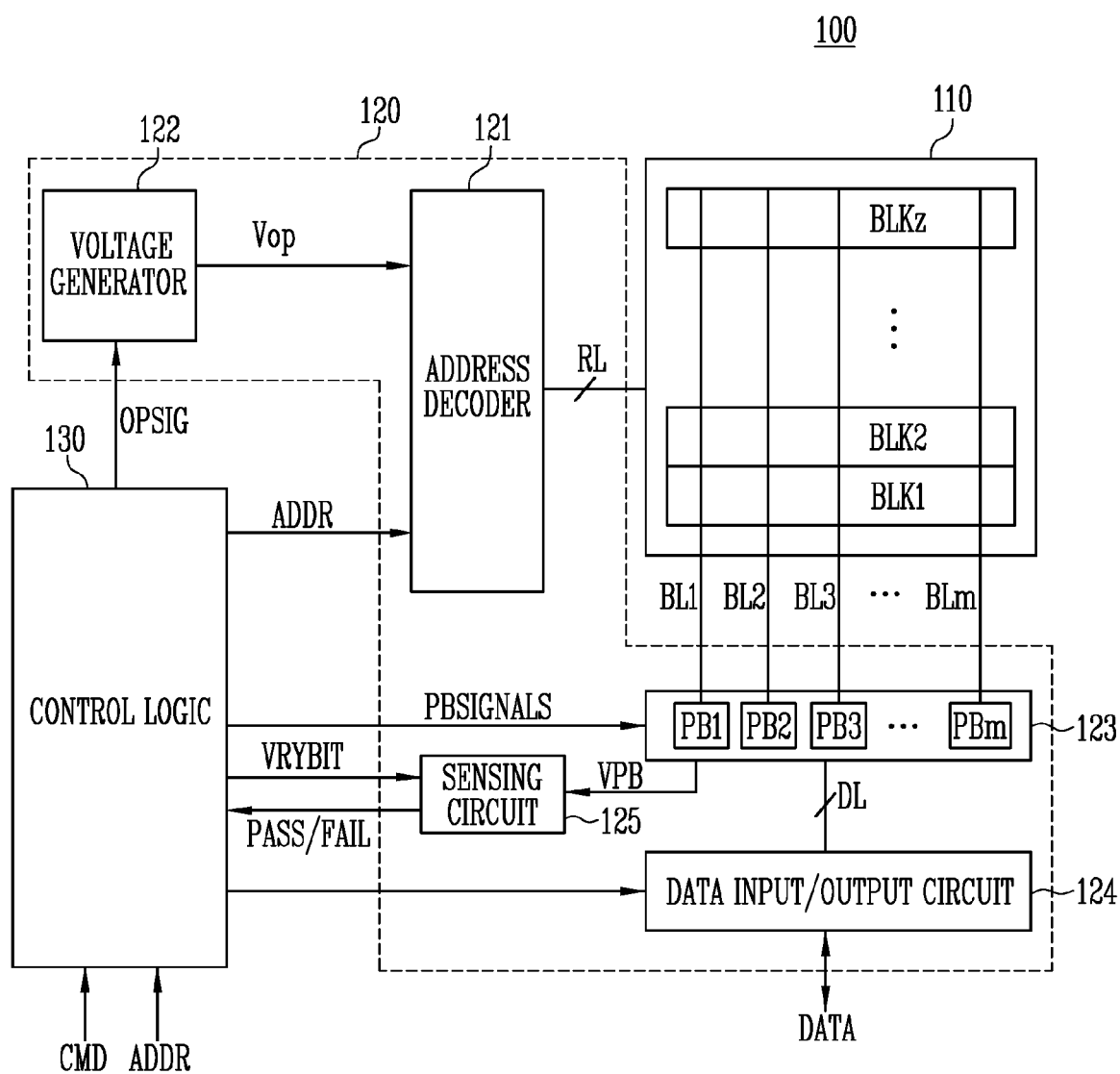
FIG. 2 is a diagram illustrating a structure of a memory device, such as that of FIG. 1.

FIG. 2 is a diagram illustrating the structure of the memory device 100 of FIG. 1.

Referring to FIG. 2, the memory device 100 may include a memory cell array 110, a peripheral circuit 120, and control logic 130.

The peripheral circuit 120 may include an address decoder 121, a voltage generator 122, a read and write circuit 123, a data input and output (input/output) circuit 124, and a sensing circuit 125.

The memory cell array 110 may include a plurality of memory blocks BLK1 to BLKz, which may be coupled to the address decoder 121 through row lines RL. The memory blocks BLK1 to BLKz may be coupled to the read and write circuit 123 through bit lines BL1 to BLm. Each of the plurality of memory blocks BLK1 to BLKz may include a plurality of memory cells. According to an embodiment, a plurality of memory cells may be non-volatile memory cells. Among the plurality of memory cells, memory cells coupled to the same word line may be defined as one page. In other words, the memory cell array 110 may include a plurality of pages. According to an embodiment, each of the plurality of memory blocks BLK1 to BLKz in the memory cell array 110 may include a plurality of dummy cells. One or more dummy cells may be coupled in series between a drain select transistor and memory cells and between a source select transistor and memory cells.

Each of the memory cells of the memory device 100 may include a single level cell (SLC) storing a single bit of data, a multi level cell (MLC) storing two bits of data, a triple level cell (TLC) storing three bits of data, or a quad level cell (QLC) storing four bits of data.

The peripheral circuit 120 may drive the memory cell array 110. For example, the peripheral circuit 120 may drive the memory cell array 110 to perform a program operation, a read operation and an erase operation.

The address decoder 121 may be coupled to the memory cell array 110 through the row lines RL. The row lines RL may include drain select lines, word lines, source select lines, and a common source line. According to an embodiment of the present disclosure, the word lines may include normal word lines and dummy word lines. According to an embodiment, the row lines RL may further include a pipe select line.

The address decoder 121 may be configured to operate in response to control of the control logic 130. The address decoder 121 may receive an address ADDR from the control logic 130.

The address decoder 121 may be configured to decode a block address of the received address ADDR. The address decoder 121 may select at least one memory block among the memory blocks BLK1 to BLKz according to the decoded block address. The address decoder 121 may be configured to decode the row address from the received address ADDR. The address decoder 121 may select at least one word line among word lines of a selected memory block according to the decoded row address. The address decoder 121 may apply operating voltages Vop supplied from the voltage generator 122 to the selected word line.

During a program operation, the address decoder 121 may apply a program voltage to the selected word line and a program pass voltage having a lower voltage level than the program voltage to unselected word lines. During a program verify operation, the address decoder 121 may apply a verify voltage to the selected word line and a verify pass voltage having a greater voltage level than the verify voltage to the unselected word lines.

During a read operation, the address decoder 121 may apply a read voltage to the selected word line and a read pass voltage having a greater voltage level than the read voltage to unselected word lines.

An erase operation of the memory device 100 may be performed in units of memory blocks. During the erase operation, the address ADDR input to the memory device 100 may include a block address. The address decoder 121 may decode the block address and select at least one of the memory blocks according to the decoded block address. During the erase operation, the address decoder 121 may apply a ground voltage to the selected word line.

The address decoder 121 may be configured to decode a column address of the received address ADDR. The decoded column address may be transferred to the read and write circuit 123. For example, the address decoder 121 may include components such as a row decoder, a column decoder and an address buffer.

The voltage generator 122 may be configured to generate the plurality of operating voltages Vop by using an external power voltage supplied to the memory device 100. The voltage generator 122 may be controlled by the control logic 130.

The voltage generator 122 may generate an internal power voltage by regulating the external power voltage. The internal power voltage generated by the voltage generator 122 may serve as an operating voltage for the memory device 100.

The voltage generator 122 may generate the plurality of operating voltages Vop by using the external power voltage or the internal power voltage. The voltage generator 122 may be configured to generate various voltages used by the memory device 100. For example, the voltage generator 122 may generate a plurality of erase voltages, a plurality of program voltages, a plurality of dummy pass voltages, a plurality of selected read voltages, and a plurality of unselected read voltages.

The voltage generator 122 may include a plurality of pumping capacitors receiving the internal power voltage to generate the plurality of operating voltages Vop having various voltage levels, and may generate the plurality of operating voltages Vop by selectively activating the plurality of pumping capacitors in response to control of the control logic 130.

The plurality of operating voltages Vop may be supplied to the memory cell array 110 by the address decoder 121.

The read and write circuit 123 may include first to mth page buffers PB1 to PBm, which may be coupled to the memory cell array 110 through the first to mth bit lines BL1 to BLm, respectively. The first to mth page buffers PB1 to PBm may operate in response to control of the control logic 130.

The first to mth page buffers PB1 to PBm may communicate data DATA with the data input/output circuit 124. During a program operation, the first to mth page buffers PB1 to PBm may receive the data DATA to be stored through the data input/output circuit 124 and data lines DL.

During a program operation, the first to mth page buffers PB1 to PBm may transfer the data DATA received through the data input/output circuit 124 to the selected memory cells through the bit lines BL1 to BLm when a program voltage is applied to the selected word line. The memory cells of the selected page may be programmed according to the transferred data DATA. A memory cell coupled to a bit line to which a program permission voltage (e.g., a ground voltage) is applied may have an increased threshold voltage. A threshold voltage of a memory cell coupled to a bit line to which a program inhibition voltage (for example, a power voltage) is applied may be maintained. During a program verify operation, the first to mth page buffers PB1 to PBm may sense the data DATA stored in the selected memory cells through the bit lines BL1 to BLm from the selected memory cells.

During a read operation, the read and write circuit 123 may read the data DATA from the memory cells of the selected page through the bit lines BL1 to BLm and may store the read data DATA in the first to mth page buffers PB1 to PBm.

During an erase operation, the read and write circuit 123 may float the bit lines BL1 to BLm. According to an embodiment, the read and write circuit 123 may include a column selection circuit.

The data input/output circuit 124 may be coupled to the first to mth page buffers PB1 to PBm through the data lines DL. The data input/output circuit 124 may operate in response to control of the control logic 130.

The data input/output circuit 124 may include a plurality of input/output buffers (not shown) receiving the input data DATA. During a program operation, the data input/output circuit 124 may receive the data DATA to be stored from an external controller (not shown). During a read operation, the data input/output circuit 124 may output the data DATA transferred from the first to mth page buffers PB1 to PBm included in the read and write circuit 123 to the external controller.

During a verify operation, the sensing circuit 125 may generate a reference current in response to an allowable bit VRYBIT generated by the control logic 130. Further, the sensing circuit 125 may output a pass signal or a fail signal to the control logic 130 by comparing a sensing voltage VPB from the read and write circuit 123 with a reference voltage generated by the reference current.

The control logic 130 may be coupled to the address decoder 121, the voltage generator 122, the read and write circuit 123, the data input/output circuit 124, and the sensing circuit 125. The control logic 130 may be configured to control the general operations of the memory device 100. The control logic 130 may operate in response to a command CMD transferred from an external device.

The control logic 130 may control the peripheral circuit 120 by generating various signals in response to the command CMD and the address ADDR. For example, the control logic 130 may generate an operation signal OPSIG, the address ADDR, read and write circuit control signals PBSIGNALS, and the allowable bit VRYBIT in response to the command CMD and the address ADDR. The control logic 130 may output the operation signal OPSIG to the voltage generator 122, output the address ADDR to the address decoder 121, output a read and write control signal to the read and write circuit 123, and output the allowable bit VRYBIT to the sensing circuit 125. In addition, the control logic 130 may determine whether a verify operation passes or fails in response to the pass or fail signal (PASS/FAIL) output by the sensing circuit 125.

Figure 3:
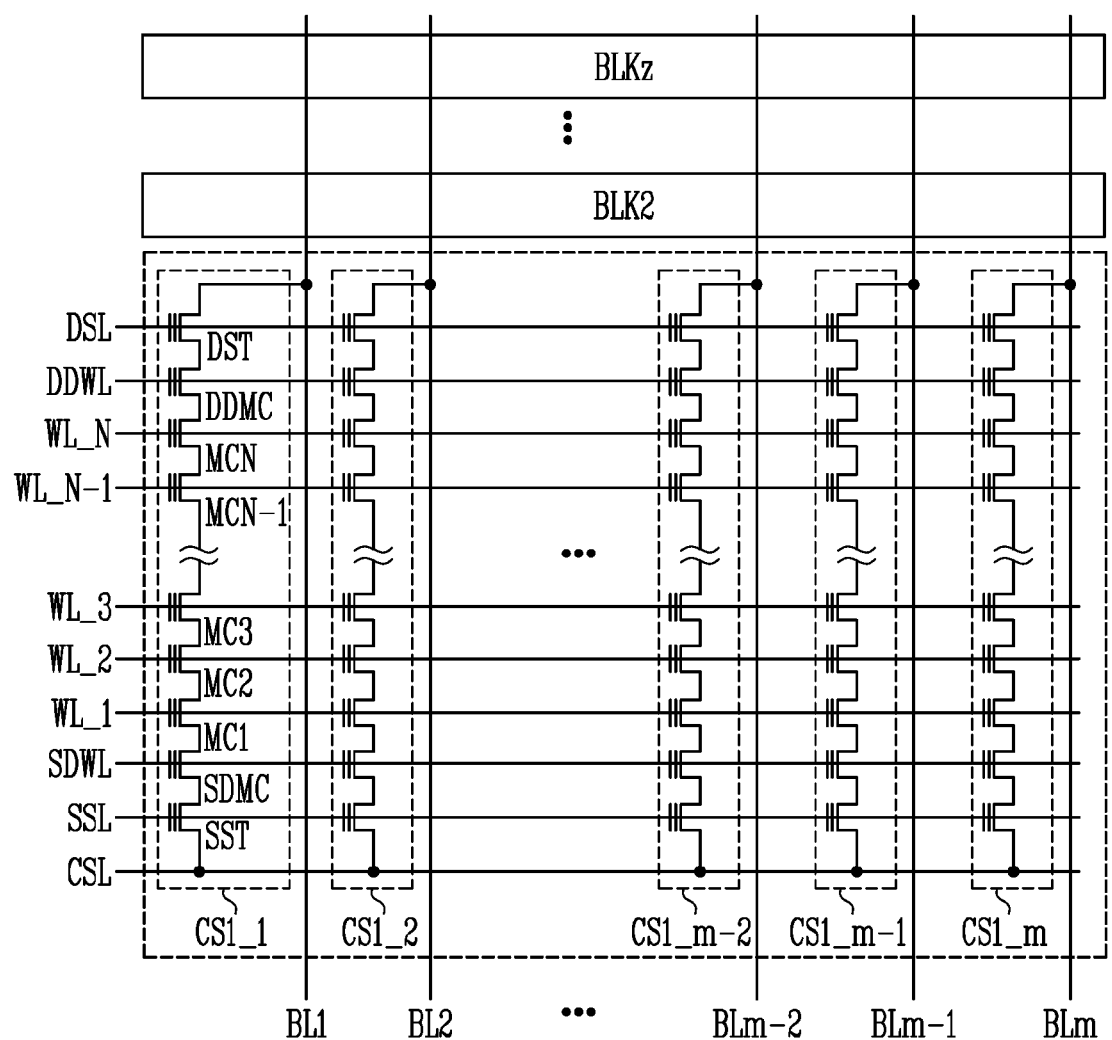
FIG. 3 is a diagram illustrating a structure of a memory cell array, such as that of FIG. 2.

FIG. 3 is a diagram illustrating the structure of the memory cell array 110 of FIG. 2.

Referring to FIG. 3, first to zth memory blocks BLK1 to BLKz may be commonly coupled to the first to mth bit lines BL1 to BLm. In FIG. 3, by way of example, components in the first memory block BLK1, among the plurality of memory blocks BLK1 to BLKz, are illustrated. Each of the second to zth memory blocks BLK2 to BLKz may have substantially the same configuration as the first memory block BLK1.

The first memory block BLK1 may include a plurality of cell strings CSL_1 to CS1_$m$, where m is a positive integer. Each of the first to mth cell strings CS1_1 to CS1_$m$ may be coupled to the first to mth bit lines BL1 to BLm, respectively. Each of the first to mth cell strings CS1_1 to CS1_$m$ may include a drain select transistor DST, a plurality of drain dummy cells DDMC coupled in series, a plurality of memory cells MC1 to MCN coupled in series, where N is a positive integer, a plurality of source dummy cells SDMC coupled in series, and a source select transistor SST.

A gate terminal of the drain select transistor DST included in each of the first to mth cell strings CS1_1 to CS1_$m$ may be coupled to a drain select line DSL. Gate terminals of the drain dummy cells DDMC included in each of the first to mth cell strings CS1_1 to CS1_$m$ may be coupled to a drain dummy word line DDWL. Gate terminals of the first to Nth dummy cells MC1 to MCN included in each of the first to mth cell strings CS1_1 to CS1_$m$ may be coupled to first to Nth word lines WL_1 to WL_N, respectively. Gate terminals of the source dummy cells SDMC included in each of the first to mth cell strings CS1_1 to CS1_$m$ may be coupled to a source dummy word line SDWL, and a gate terminal of the source select transistor SST included in each of the first to mth cell strings CS1_1 to CS1_$m$ may be coupled to a source select line SSL.

By way of example, the structure of the first cell string CS1_1 among the plurality of cell strings CS1_1 to CS1_$m$, is described. Each of the second to mth cell strings CS1_2 to CS1_$m$ may be configured in the same manner as the first cell string CS1_1.

A drain terminal of the drain select transistor DST included in the first cell string CS1_1 may be coupled to the first bit line BL1. A source terminal of the drain select transistor DST included in the first cell string CS1_1 may be coupled to a drain terminal of the drain dummy cell DDMC included in the first cell string CS1_1. The first to Nth memory cells MC1 to MCN may be coupled in series with each other. The drain dummy cell DDMC may be coupled in series with the Nth memory cell MCN and the first memory cell MC1 may be coupled in series with the source dummy cell SDMC. A drain terminal of the source select transistor SST included in the first cell string CS1_1 may be coupled to a source terminal of the source dummy cell SDMC included in the first cell string CS1_1. A source terminal of the source select transistor SST included in the first cell string CS1_1 may be coupled to a common source line CSL. According to an embodiment, the common source line CSL may be commonly connected to the first to zth memory blocks BLK1 to BLKz.

The drain select line DSL, the drain dummy word line DDWL, the first to Nth word lines WL_1 to WL_N, the source dummy word line SDWL and the source select line SSL may be included in the row lines RL as shown in FIG. 2. The drain select line DSL, the drain dummy word line DDWL, the first to Nth word lines WL_1 to WL_N, the source dummy word line SDWL and the source select line SSL may be controlled by the address decoder 121. The common source line CSL may be controlled by the control logic 130. The first to mth bit lines BL1 to BLm may be controlled by the read and write circuit 123.

Figure 4:
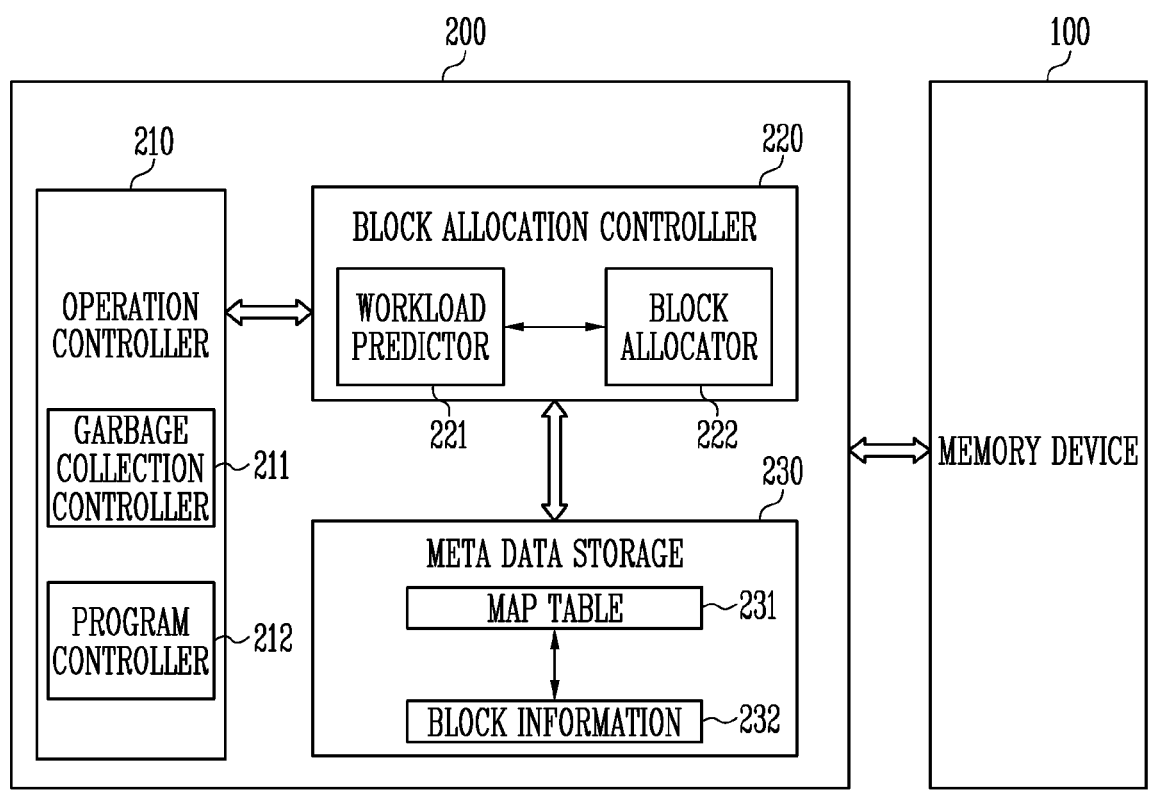
FIG. 4 is a diagram illustrating a structure of a memory controller.

FIG. 4 is a diagram illustrating the structure of the memory controller 200.

Referring to FIG. 4, the memory controller 200 may include the operation controller 210, the block allocation controller 220 and the meta data storage 230.

The operation controller 210 may include a garbage collection controller 211 and a program controller 212.

The garbage collection controller 211 may control the memory device 100 to perform a garbage collection operation. The garbage collection controller 211 may determine a victim block as a target block to perform a garbage collection operation on and may transfer information about the determined victim block to the block allocation controller 220. The information about the victim block may be physical address information of the determined victim block.

The garbage collection controller 211 may control the memory device 100 to read valid data stored in the victim block and store the read data in the target block allocated by the block allocation controller 220.

The program controller 212 may control the memory device 100 to store write data in the memory device 100 in response to a write request from the host 400.

The program controller 212 may request the block allocation controller 220 to allocate a free block in order to translate a logical address into a physical address. The program controller 212 may generate a program command for instructing the allocated free block to store the write data, and may provide the generated program command to the memory device 100.

The block allocation controller 220 may include a workload predictor 221 and a block allocator 222.

The workload predictor 221 may predict workload of the storage device 50.

When a garbage collection operation is performed, the workload predictor 221 may predict workload according to the number of map segments corresponding to the valid data stored in the victim block on the basis of the information about the victim block provided from the garbage collection controller 211. The workload predictor 221 may determine that the valid data is random data when the number of map segments corresponding to the valid data stored in the victim block is greater than a threshold value. On the other hand, the workload predictor 221 may determine that the valid data is sequential data when the number of map segments corresponding to the valid data stored in the victim block is smaller than the threshold value. The sequential data may be treated as cold data which is relatively infrequently accessed by the host 400. The random data may be treated as hot data which is relatively frequently accessed by the host 400. The workload predictor 221 may provide the block allocator 222 with workload information indicating whether the valid data stored in the victim block is the hot data or the cold data.

When the write request provided by the host 400 is executed, the workload predictor 221 may predict workload in response to a free block allocation request from the program controller 212.

The workload predictor 221 may predict workload on the basis of the amount of data stored in the memory device 100 and the number of map segments corresponding to the valid data stored in the memory device 100. More specifically, the workload predictor 221 may predict workload on the basis of a ratio of the number of free blocks to the number of map segments corresponding to the valid data, or a ratio of the number of write-completed blocks to the number of map segments corresponding to the valid data.

For example, when there are ten (10) free blocks and one hundred (100) free blocks, and there are three-thousand (3000) map segments corresponding to valid data for the 10 free blocks and the 100 free blocks each, the number of map segments divided by the numbers of free blocks is 300 and 30, respectively. When the quotient of the division is larger, workload may contain a relatively large amount of random data. When the number of write-completed blocks is used to predict workload, if there are a thousand (1000) write-completed blocks and two-thousand (2000) write-completed blocks, and there are 1000 map segments corresponding to valid data for each of the numbers of write-completed blocks. The number of map segments divided by the numbers of write-completed blocks is 1 and 0.5, respectively. When the quotient of the division is smaller, workload may contain a relatively large amount of sequential data.

The workload predictor 221 may compare a threshold ratio with a ratio of the number of free blocks to the number of map segments corresponding to valid data, or a ratio of the number of write-completed blocks to the number of map segments corresponding to the valid data. Further, the workload predictor 221 may determine whether the currently stored data is mostly sequential data or random data, based on the threshold comparison result. When the data contains large sequential data, it may be predicted that a write request mainly for cold data which is infrequently accessed by the host 400 may be input. On the other hand, when the data contains large random data, it may be predicted that a write request mainly for hot data which is frequently accessed by the host 400 may be input. The workload predictor 221 may provide the block allocator 222 with hot data workload information indicating that the current workload is focused on hot data, or cold data workload information indicating that the current workload is focused on cold data.

The block allocator 222 may allocate a memory block according to the workload information from the workload predictor 221. More specifically, the block allocator 222 may allocate a memory block with a relatively low erase count in response to the workload information indicating that the valid data stored in the victim block is hot data. On the other hand, the block allocator 222 may allocate a memory block with a relatively high erase count in response to the workload information indicating that the valid data stored in the victim block is cold data.

According to an embodiment, the block allocator 222 may allocate a memory block with the lowest erase count as a garbage collection target block according to the erase count information of the free blocks in response to the workload information indicating that the valid data stored in the victim block is hot data. On the other hand, the block allocator 222 may allocate a memory block with the highest erase count as the garbage collection target block according to the erase count information of the free blocks in response to the workload information indicating that the valid data stored in the victim block is cold data.

According to various embodiments, the block allocator 222 may allocate a memory block with the lowest erase count, among memory blocks having erase counts lower than a threshold count, as the garbage collection target block according to the erase count information of the free blocks in response to the workload information indicating that the valid data stored in the victim block is hot data. However, the block allocator 222 may allocate a memory block with the highest erase count, among the memory blocks having the erase counts lower than the threshold count, as the garbage collection target block according to the erase count information of the free blocks in response to the workload information indicating that the valid data stored in the victim block is cold data.

According to an embodiment, the block allocator 222 may allocate a memory block with the lowest erase count as a memory block to store write data according to the erase count information of the free blocks in response to hot data workload information. On the other hand, the block allocator 222 may allocate a memory block with the highest erase count as the memory block to store the write data in response to cold data workload information.

According to various embodiments, the block allocator 222 may allocate a memory block with the lowest erase count, among memory blocks having erase counts lower than a threshold count, as a memory block to store write data according to the erase count information of the free blocks in response to hot data workload information. On the other hand, the block allocator 222 may allocate a memory block with the highest erase count, among the memory blocks having the erase counts lower than the threshold count, as the memory block to store the write data according to the erase count information of the free blocks in response to cold data workload information.

The meta data storage 230 may include a map table 231 and block information 232. The map table 231 may include mapping information between physical addresses corresponding to the first to zth memory blocks BLK1 to BLKz as described above with reference to FIG. 3 and logical addresses corresponding to the physical addresses, respectively. The map table 231 may include a plurality of map segments. Each of the map segments may include a plurality of map entries. A map entry may refer to mapping information corresponding to one logical address. According to an embodiment, a map segment may be a unit for reading the mapping information.

The block information 232 may refer to information about memory blocks included in the memory device 100.

The block information 232 may further include information about the number of map segments corresponding to valid data stored in each of the memory blocks and erase count information indicating erase counts of the respective memory blocks. According to an embodiment, the block information 232 may further include block status information indicating a status of each memory block. More specifically, the block status information may indicate whether a memory block is a write-completed block in which data has been completely stored, a free block in which data is empty, an open block in which data has not been completely stored, or a bad block.

FIG. 5 is a diagram illustrating the map table 231 of FIG. 4.

By way of example, FIG. 5 shows the map table 231 for one memory block. However, the meta data storage 230 may include a map table for each of the memory blocks.

The map table 231 of FIG. 5 may include first to fifth map segments seg1 to seg5. In the illustrated example of FIG. 5, each map segment includes two map entries. However, the number of map entries included in one map segment is not limited to two; each map segment may include any suitable number of map entries.

Each of the map entries may include information about the physical block addresses PBA mapped to the logical block addresses LBA of the data provided by the host. For example, first to tenth logical block addresses LBA1 to LBA10 may correspond to first to tenth physical block addresses PBA1 to PBA10, respectively. By way of example, only the first to tenth logical block address LBA1 to LBA10 and the first to tenth physical block addresses PBA1 to PBA10 are shown in FIG. 5. However, the present disclosure is not limited thereto.

FIG. 6 is a diagram illustrating block information of FIG. 4.

Referring to FIG. 6, block information may include erase count information 232a and valid data information 232b.

The erase count information 232a may include an erase count (Erase_Count) for each memory block in the memory device. Each erase count indicates the number of times the corresponding memory block is erased.

According to an embodiment, the erase count information 232a may further include a valid data segment count (Valid_Seg_Count) for each memory block in the memory device. Each valid data segment count indicates the number of map segments corresponding to valid data stored in the corresponding memory block.

A memory block having a valid data segment count greater than zero (0) may store data. A memory block having a valid data segment count of zero (0) may be a free block containing no data.

The valid data information 232b may include information indicating whether the data stored in the first memory block BLK1 is valid data or not. For example, the valid data information 232b may include multiple logical block address LBA and physical block address (PBA) pairs along with an indication as to whether or not the data associated with each pair is valid (Valid/Invalid).

The valid data segment count (Valid_Seg_Count) in the erase count information 232a for a given memory block may be calculated based on the valid data information 232b corresponding to that memory block. For example, assuming that one map segment includes map data (map entries) on two logical addresses, the valid data segment count of the first memory block BLK1 may be three (3), which indicates a map segment including map entries of the first and second logical block addresses LBA1 and LBA2, a map segment including a map entry of the sixth logical block address LBA6 and a map segment including a map entry of the tenth logical block address LBA10.

Figure 7:
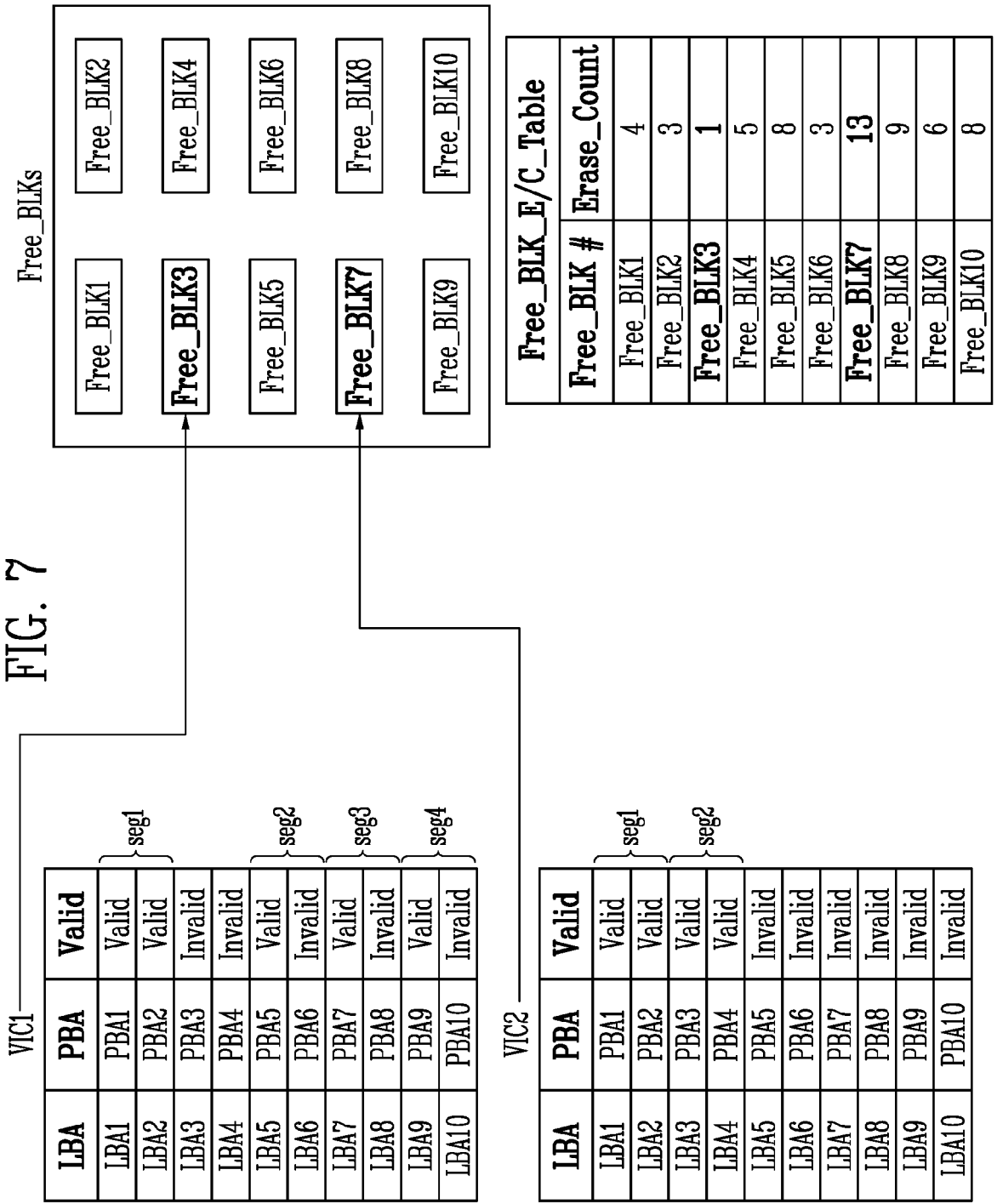
FIG. 7 is a diagram illustrating a method of allocating a target block during a garbage collection operation by a storage device according to an embodiment of the present disclosure.

FIG. 7 is a diagram illustrating a method of allocating a target block during a garbage collection operation according to an embodiment of the present disclosure. The method may be performed by a storage device.

Referring to FIGS. 4 and 7, it is assumed that the valid data (Valid) stored in two victim blocks VIC1 and VIC2 is stored in a new free block through a garbage collection operation. The two victim blocks VIC1 and VIC2 may be memory blocks determined as victim blocks during two distinct garbage collection operations, respectively.

The block allocation controller 220 may allocate a free block to store the valid data stored in the first victim block VIC1 by using a map table of the first victim block VIC1.

More specifically, the workload predictor 221 may determine the number of map segments corresponding to the valid data stored in the first victim block VIC1 by using the map table of the first victim block VIC1. Referring to FIG. 7, four (4) map segments may correspond to the valid data stored in the first victim block VIC1. More specifically, data corresponding to the first, second, fifth, seventh and ninth logical block addresses LBA1, LBA2, LBA5, LBA7 and LBA9 of the first victim block VIC1 may be valid. Data corresponding to the third, fourth, sixth, eighth and tenth logical block addresses LBA3, LBA4, LBA6, LBA8 and LBA10 may be invalid, i.e., invalid data (Invalid). Segments corresponding to the valid data may include the first segment seg1 corresponding to the first and second logical block addresses LBA1 and LBA2, the second segment seg2 corresponding to the fifth and sixth logical block addresses LBA5 and LBA6, the third segment seg3 corresponding to the seventh and eighth logical block address LBA7 and LBA8, and the fourth segment seg4 corresponding to the ninth and tenth logical block address LBA9 and LBA10. Therefore, the first victim block VIC1 may have a valid data segment count of 4.

The workload predictor 221 may compare the valid data segment count of the first victim block VIC1 with a threshold value, which may be determined in advance. As a result of the comparison, when the valid data segment count is greater than the threshold value, the workload predictor 221 may determine an attribute of the data stored in the victim block as random data. In some embodiments, the threshold value may be determined by the size of the memory device or the memory block. For example, the threshold value may be 3. Since the first victim block VIC1 has the valid data segment count of 4 which is greater than the threshold value of 3, the workload predictor 221 may determine the attribute of the data stored in the first victim block VIC1 as random data. According to an embodiment, the random data may be treated as hot data.

The block allocator 222 may allocate a target block to store the valid data of the first victim block VIC1 on the basis of workload information indicating that valid data stored in the victim block is the hot data. More specifically, the block allocator 222 may allocate a free block having the lowest erase count, among first to tenth free blocks (Free_BLK1 to Free_BLK10), as a garbage collection target block. The block allocator 222 may allocate a free block to store the valid data stored in the first victim block VIC1 on the basis of erase count information (Free_BLK_E/C_Table) of the free blocks included in the block information 232. The block allocator 222 may allocate the third free block Free_BLK3 having the lowest erase count (i.e., 1), among the first to tenth free blocks Free_BLK1 to Free_BLK10, as a target block to store the valid data stored in the first victim block VIC1.

The workload predictor 221 may allocate a target block to store the valid data stored in the second victim block VIC2 on the basis of the number of map segments corresponding to the valid data stored in the second victim block VIC2.

More specifically, map segments corresponding to the valid data stored in the second victim block VIC2 may include the first segment seg1 corresponding to the first and second logical block addresses LBA1 and LBA2 and the second segment seg2 corresponding to the third and fourth logical block addresses LBA3 and LBA4. Therefore, the total valid data segment count may be 2.

The workload predictor 221 may compare the valid data segment count of the second victim block VIC2 with a threshold value, which may be determined in advance. As a result of the comparison, when the valid data segment count is smaller than the threshold value, the workload predictor 221 may determine that the data stored in the victim block has an attribute of being sequential data. For example, the threshold value may be 3. Since the second victim block VIC2 has a valid data segment count of 2, which is smaller than the threshold value of 3, the workload predictor 221 may determine that the data stored in the second victim block VIC2 is sequential data. According to an embodiment, sequential data may be treated as cold data.

The block allocator 222 may allocate a free block having the highest erase count, among the first to tenth free blocks Free_BLK1 to Free_BLK10, as the target block to store the valid data stored in the second victim block VIC2. Therefore, the block allocator 222 may allocate the seventh free block Free_BLK7, having an erase count of 13, as the target block to store the valid data stored in the second victim block VIC2.

Figure 8:
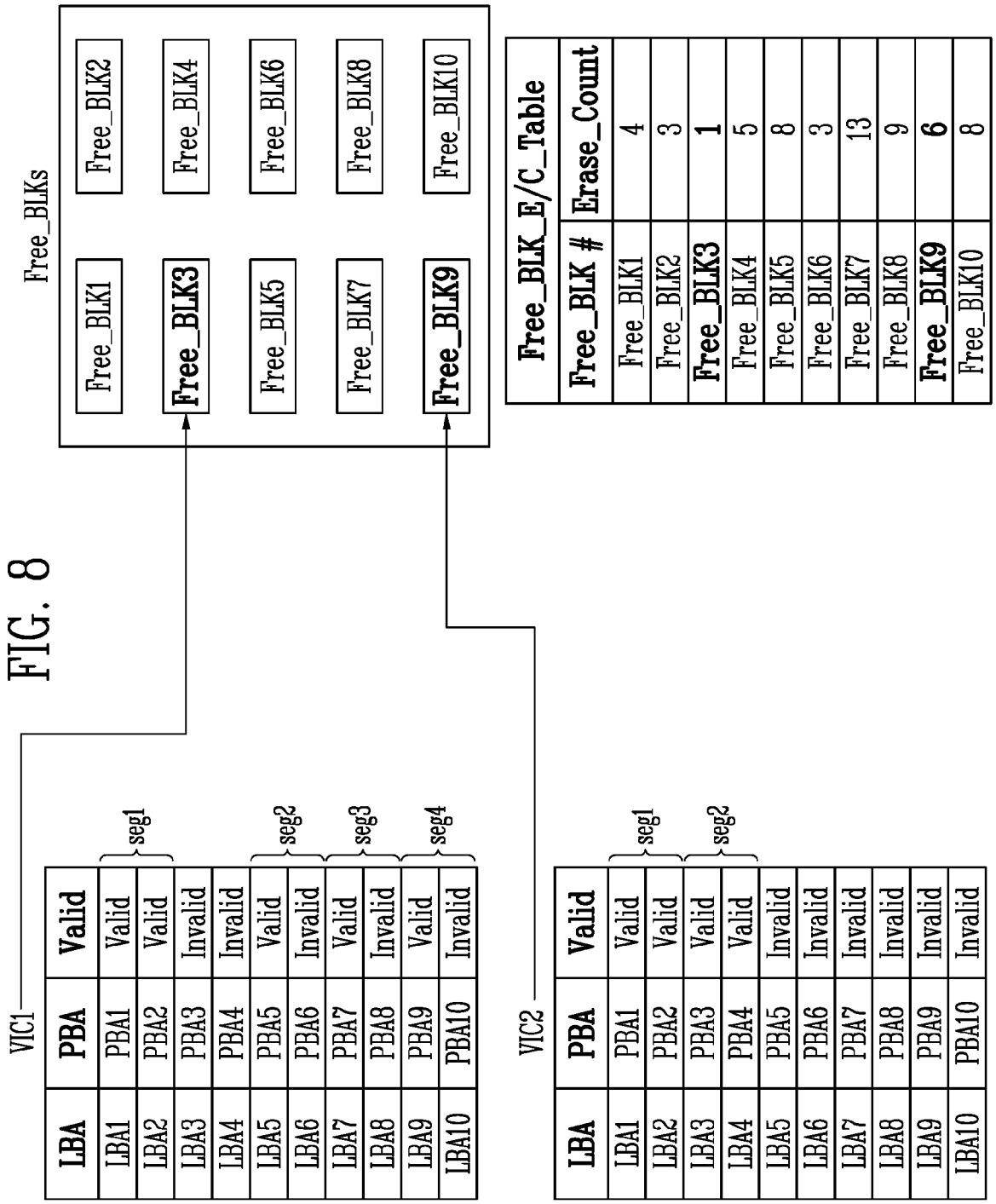
FIG. 8 is a diagram illustrating a method of allocating a target block during a garbage collection operation by a storage device according to an embodiment of the present disclosure.

FIG. 8 is a diagram illustrating a method of allocating a target block during a garbage collection operation by a storage device according to an embodiment of the present disclosure.

Referring to FIGS. 4 and 8, the workload predictor 221 may determine that the data stored in the first victim block VIC1 has an attribute of being random data as described with reference to FIG. 7. According to an embodiment, random data may be treated as hot data. The block allocator 222 may allocate a target block to store the valid data of the first victim block VIC1 in response to workload information indicating that the valid data stored in the first victim block VIC1 is hot data.

The block allocator 222 may allocate one of the free blocks having an erase count smaller than an erase count threshold value among the first to tenth free blocks Free_BLK1 to Free_BLK10. In an example in which the erase count threshold value is 7, the block allocator 222 may allocate the third free block Free_BLK3 having the lowest erase count (i.e., 1), among free blocks having erase counts smaller than 7, as a garbage collection target block.

In the same manner, the workload predictor 221 may determine that data stored in the second victim block VIC2 has the attribute of being sequential data. According to an embodiment, sequential data may be treated as cold data. The block allocator 222 may allocate a target block to store the valid data of the second victim block VIC2 in response to workload information indicating that the valid data stored in the second victim block VIC2 is cold data.

The block allocator 222 may allocate one of the free blocks having erase count(s) smaller than the erase count threshold value among the first to tenth free blocks Free_BLK1 to Free_BLK10. In an example in which the erase count threshold value is 7, the block allocator 222 may allocate the ninth free block Free_BLK9 having the highest erase count (i.e., 6), among the free blocks having erase counts smaller than 7, as the garbage collection target block.

Figure 9:
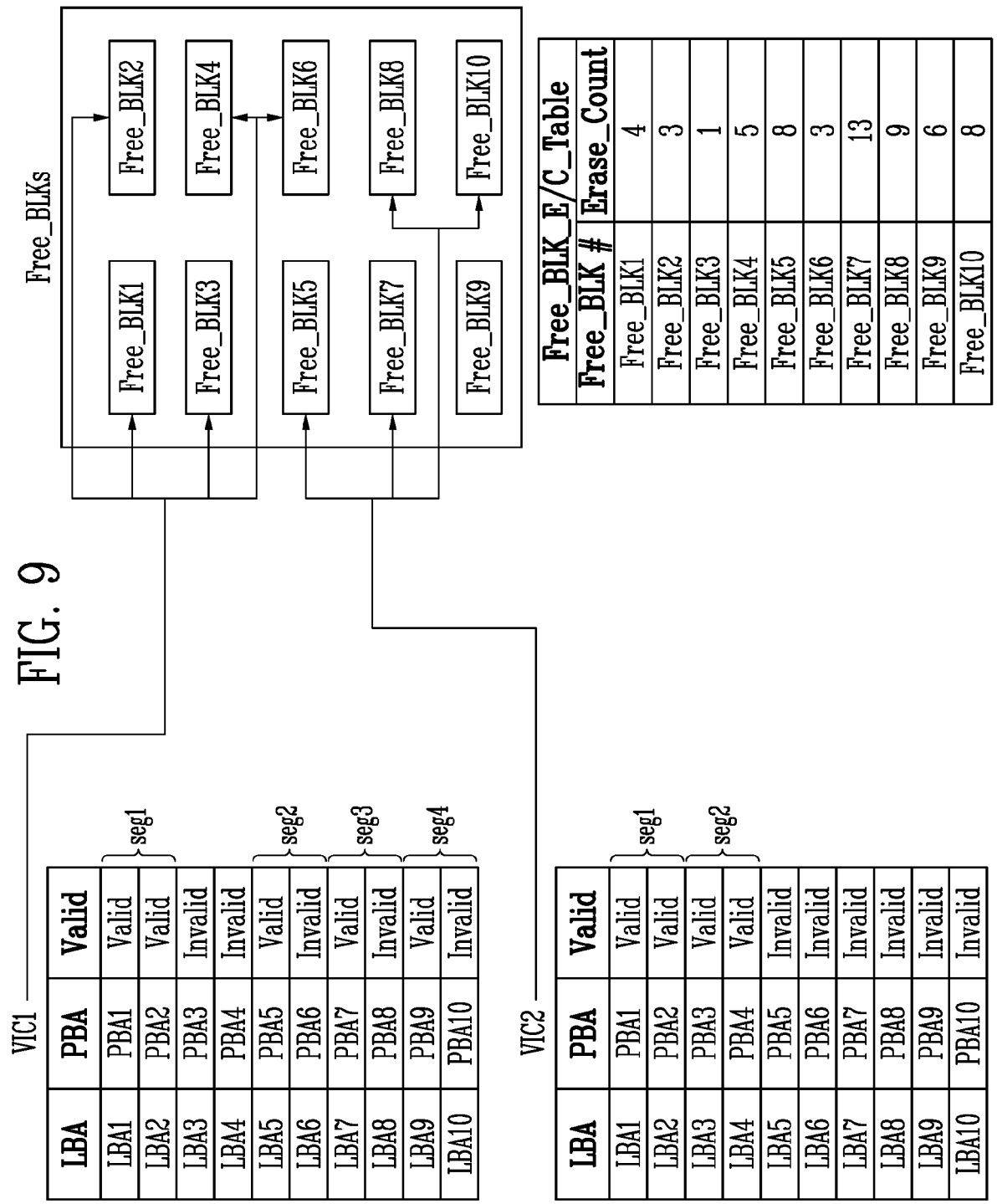
FIG. 9 is a diagram illustrating a method of allocating a target block during a garbage collection operation by a storage device according to another embodiment of the present disclosure.

FIG. 9 is a diagram illustrating a method of allocating a target block during a garbage collection operation by a storage device according to another embodiment of the present disclosure.

Referring to FIGS. 4 and 9, the workload predictor 221 may determine an attribute of the data stored in the first victim block VIC1 as random data as described with reference to FIG. 7. According to an embodiment, random data may be treated as hot data. The block allocator 222 may allocate a target block to store the valid data of the first victim block VIC1 in response to workload information indicating that the valid data stored in the first victim block VIC1 is the hot data.

In the embodiment of FIG. 9, the block allocator 222 may allocate a target block to store valid data stored in a victim block by using an average erase count of free blocks.

The block allocator 222 may calculate an average erase count of the first to tenth free blocks Free_BLK1 to Free_BLK10. The average erase count may be calculated by dividing the sum of the erase counts of the first to tenth free blocks Free_BLK1 to Free_BLK10 by the number of free blocks. Since the total erase count of the first to tenth free blocks Free_BLK1 to Free_BLK10 is 60, the average erase count is 6.

The block allocator 222 may allocate one of the free blocks having an erase count smaller than the average erase count among the first to tenth free blocks Free_BLK1 to Free_BLK10 as a garbage collection target block. The block allocator 222 may allocate any of the free blocks having an erase count smaller than 6 (the average erase count) as the garbage collection target block. Therefore, any of the first to fourth free blocks Free_BLK1 to Free_BLK4 or the sixth free block Free_BLK6 may be allocated as the garbage collection target block.

The workload predictor 221 may determine the attribute of the data stored in the second victim block VIC2 as sequential data. According to an embodiment, sequential data may be treated as cold data. The block allocator 222 may allocate a target block to store the valid data of the second victim block VIC2 in response to workload information indicating that the valid data stored in the second victim block VIC2 is the cold data.

The block allocator 222 may allocate one of the free blocks having an erase count greater than the average erase count, among the first to tenth free blocks Free_BLK1 to Free_BLK10, as a garbage collection target block. Since the average erase count is 6, the block allocator 222 may allocate any free block having an erase counts greater than 6 (average erase count) as the garbage collection target block. Therefore, the block allocator 222 may allocate one of the fifth free block Free_BLK5, the seventh free block Free_BLK7, the eighth free block Free_BLK8 and the tenth free block Free_BLK10 (i.e., free blocks having erase counts of 8, 13, 9 and 8, respectively) as the garbage collection target block.

FIG. 10 is a diagram illustrating another embodiment of the block information of FIG. 4.

Figure 11:
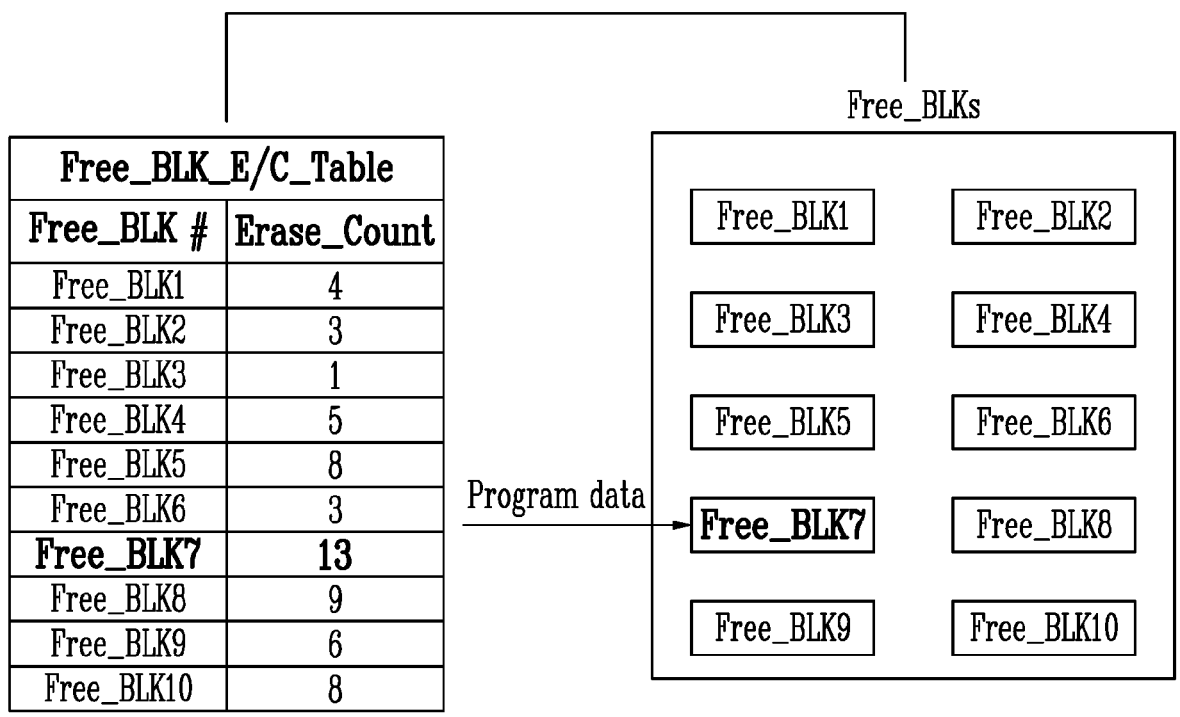
FIG. 11 is a diagram illustrating a method of allocating a free block to store write data of a host on the basis of the number of map segments corresponding to valid data of a write-completed block.

FIG. 11 is a diagram illustrating a method of allocating a free block to store write data of a host on the basis of the number of map segments corresponding to valid data of a write-completed block as shown in FIG. 10.

Referring to FIGS. 10 and 11, information 232c may be maintained for each write-completed block about the number of map segments corresponding to valid data of that write-completed block.

The memory controller 200 may predict workload provided by the host 400 in response to a write request input from the host 400.

More specifically, the memory controller 200 may predict workload on the basis of a ratio of the number of write-completed blocks to the number of map segments corresponding to the valid data.

In the illustrated example of FIG. 10, a write-completed block valid data segment table (Closed_BLK_V/S_Table) may include a valid data segment count (Valid_Seg_Count) for each of first to tenth write-completed blocks Closed_BLK1 to Closed_BLK10. Each of the valid data segment counts (Valid_Seg_Count) may indicate the number of map segments corresponding to valid data stored in that memory block.

According to an embodiment, the write-completed block valid data segment table (Closed_BLK_V/S_Table) may include the total number of write-completed blocks, i.e., Closed_BLK1 to Closed_BLK10, and for each such block the valid data segment count (Valid_Seg_Count). The write-completed block valid data segment table may also include the sum of the valid data segment counts of Closed_BLK1 to Closed_BLK10, which in the illustrated embodiment of FIG. 10 is 26.

The memory controller 200 may predict a host data attribute on the basis of the sum of the valid data segment counts and the number of write-completed blocks. The total valid data segment count of 24 divided by the number of write-completed blocks (Closed_BLK), i.e., 10 is 2.4. The memory controller 200 may compare the ratio of the number of write-completed blocks to the number of map segments with a threshold value. Further, the memory controller 200 may determine whether the currently stored data is mostly sequential data or random data based on the comparison result. Assuming that the threshold value is 3, the ratio of the number of write-completed blocks to the number of map segments corresponding to the valid data, which is 2.4 in the embodiment of FIG. 10, is less than the threshold value. Therefore, the memory controller 200 may determine that the workload primarily comprises sequential data. When the stored data is primarily sequential data, it may be predicted that a write request focused on cold data which is relatively infrequently accessed by the host 400 is input.

Referring to FIG. 11, the memory controller 200 may allocate a block with the highest erase count, among the first to tenth free blocks Free_BLK1 to Free_BLK10, as a memory block to store write data.

More specifically, the memory controller 200 may allocate the seventh free block Free_BLK7 having the highest ease count (i.e., 13), among the first to tenth free blocks Free_BLK1 to Free_BLK10, as the memory block to store the write data.

According to an embodiment, the memory controller 200 may allocate one of the free blocks having an erase count smaller than an erase count threshold value among the first to tenth free blocks Free_BLK1 to Free_BLK10, as the memory block to store write data. For example, when the erase count threshold value is 7, the memory controller 200 may allocate the third free block Free_BLK3 having the lowest erase count (i.e., 1), among the free blocks having erase counts smaller than 7, as the memory block to store write data.

According to an embodiment, the memory controller 200 may calculate an average erase count of the first to tenth free blocks Free_BLK1 to Free_BLK10. The average erase count may be calculated by dividing the sum of the erase counts of the first to tenth free blocks Free_BLK1 to Free_BLK10 by the number of free blocks. The total erase count of the first to tenth free blocks Free_BLK1 to Free_BLK10 may be 60. In that case, the average erase count of the first to tenth free blocks Free_BLK1 to Free_BLK10 is 6.

The memory controller 200 may allocate one of the free blocks having an erase count smaller than the average erase count, among the first to tenth free blocks Free_BLK1 to Free_BLK10, as a memory block to store write data. For example, the memory controller 200 may allocate any free block having erase count smaller than 6 as a garbage collection target open block. Therefore, one of Free_BLK1 to Free_BLK4 and Free_BLK6, which have erase counts of 4, 3, 1, 5 and 3, respectively, may be allocated as the memory block to store the write data.

FIG. 12 is a diagram illustrating another embodiment of the block information of FIG. 4.

Figure 13:
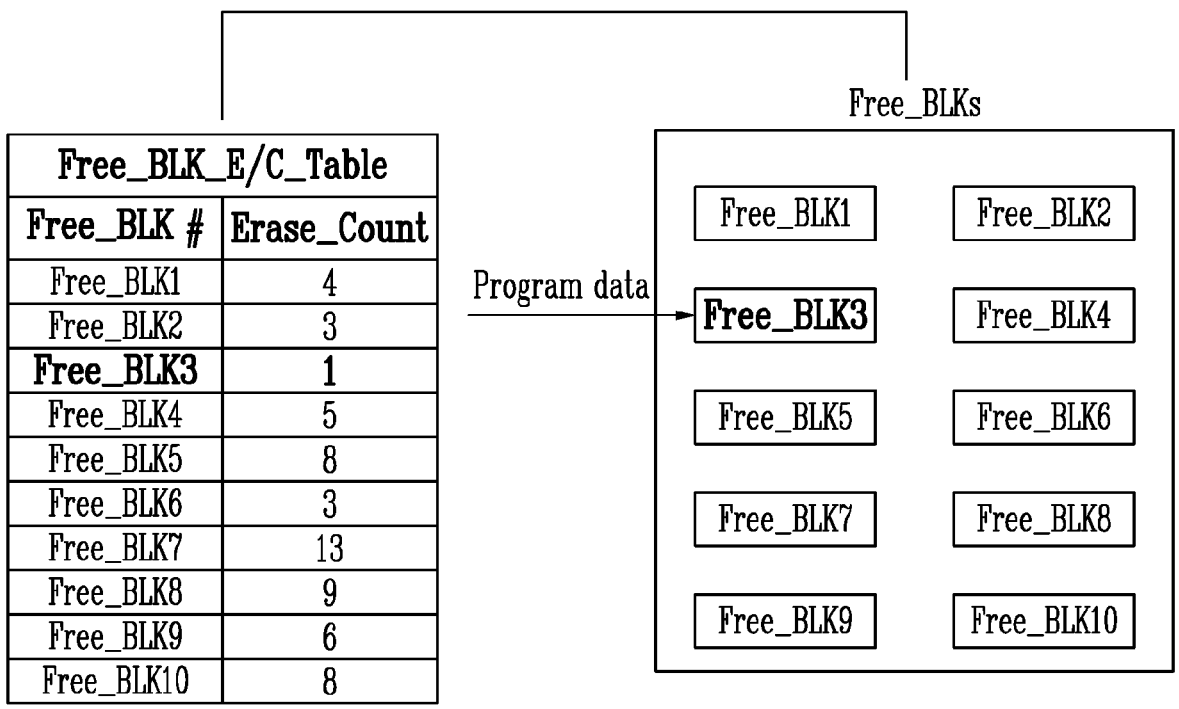
FIG. 13 is a diagram illustrating a method of allocating a free block to store write data of a host on the basis of the number of map segments corresponding to valid data of a write-completed block.

FIG. 13 is a diagram illustrating a method of allocating a free block to store write data of a host on the basis of the number of map segments corresponding to valid data of a write-completed block as shown in FIG. 12.

Referring to FIGS. 12 and 13, for each write-completed block, information 232d may be maintained about the number of map segments corresponding to the valid data of the corresponding write-completed block.

The memory controller 200 may predict workload provided by the host 400 in response to a write request input from the host 400.

More specifically, the memory controller 200 may predict workload on the basis of a ratio of the number of write-completed blocks to the number of map segments corresponding to the valid data.

In the illustrated example of FIG. 12, the write-completed block valid data segment table (Closed_BLK_V/S_Table) may include a valid data segment count (Valid_Seg_Count) for each of the first to tenth write-completed blocks Closed_BLK1 to Closed_BLK10. Each of the valid data segment counts (Valid_Seg_Count) may indicate the number of map segments corresponding to the valid data stored in the corresponding memory block.

According to an embodiment, the write-completed block valid data segment table (Closed_BLK_V/S_Table) may include the total number of write-completed blocks and the sum of the valid data segment counts (Valid_Seg_Counts) of the first to tenth write-completed blocks Closed_BLK1 to Closed_BLK10, which in this case is 34.

The memory controller 200 may predict a host data attribute on the basis of the sum of all valid data segment counts and the number of write-completed blocks. The sum of the valid data segment counts, which is 38 in this case, divided by the number of write-completed blocks, i.e., 10 is 3.8. The memory controller 200 may compare the ratio of the number of write-completed blocks to the number of map segments with a threshold value. Further, the memory controller 200 may determine whether the currently stored data is mostly sequential data or random data. Assuming that the threshold value is 3, the memory controller 200 may determine the workload as primarily a random workload since the ratio of the number of write-completed blocks to the number of map segments corresponding to the valid data is greater than the threshold value. When there is relatively large percentage of random data, it may be predicted that a write request focused on hot data which is frequently accessed by the host 400 is input.

Referring to FIG. 13, the memory controller 200 may allocate a block with the lowest erase count, among the first to tenth free blocks Free_BLK1 to Free_BLK10, as a memory block to store write data.

The memory controller 200 may allocate Free_BLK3 having the lowest ease count (i.e., 1), among the first to tenth free blocks Free_BLK1 to Free_BLK10, as the memory block to store the write data.

According to an embodiment, the memory controller 200 may allocate one of the free blocks having an erase count smaller than an erase count threshold value among the first to tenth free blocks Free_BLK1 to Free_BLK10, as the memory block to store write data. When the erase count threshold value is 7, the memory controller 200 may allocate Free_BLK3 having the lowest erase count (i.e., 1), among the free blocks having the erase counts smaller than 7 (i.e., Free_BLK1, Free_BLK2, Free_BLK3, Free_BLK4, Free_BLK6, Free_BLK9), among the first to tenth free blocks Free_BLK1 to Free_BLK10, as the memory block to store write data.

According to an embodiment, the memory controller 200 may calculate an average erase count of the first to tenth free blocks Free_BLK1 to Free_BLK10. The average erase count may be calculated by dividing the sum of the erase counts of the first to tenth free blocks Free_BLK1 to Free_BLK10 by the number of free blocks. The total erase count of the first to tenth free blocks Free_BLK1 to Free_BLK10 may be 60. In that case, the average erase count of the first to tenth free blocks Free_BLK1 to Free_BLK10 is 6.

The memory controller 200 may allocate one of the free blocks having an erase count smaller than the average erase count, among the first to tenth free blocks Free_BLK1 to Free_BLK10, as a memory block to store write data. For example, the memory controller 200 may allocate any free block having an erase count smaller than 6 as a memory block to store write data.

Therefore, one of Free_BLK1 to Free_BLK4 and Free_BLK6, which have erase counts of 4, 3, 1, 5 and 3, respectively, may be allocated as the memory block to store the write data.

Figure 14:
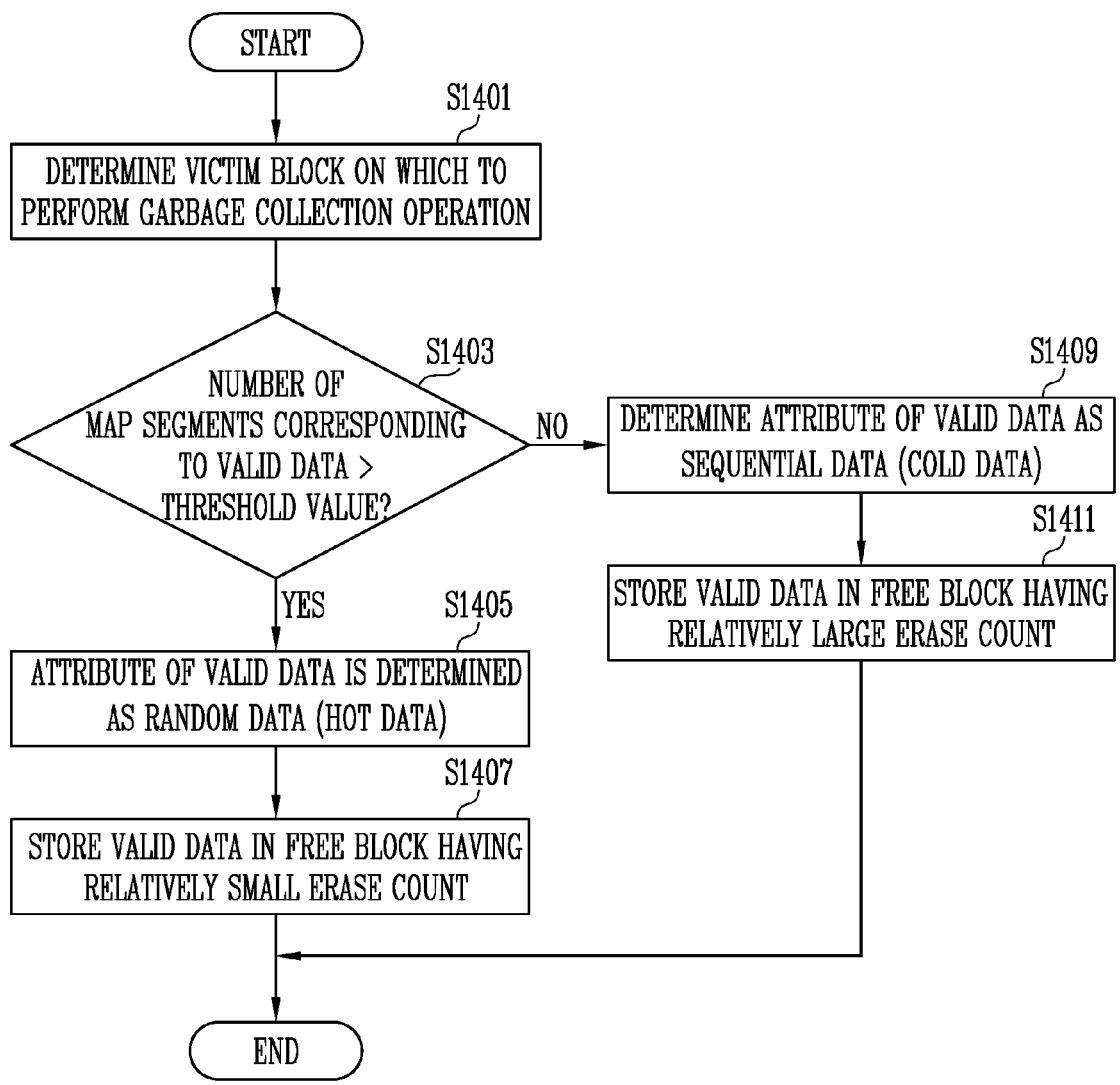
FIG. 14 is a flowchart illustrating a method of operating a storage device according to an embodiment of the present disclosure.

FIG. 14 is a flowchart illustrating a method of operating a storage device according to an embodiment of the present disclosure.

Referring to FIG. 14, at operation S1401, the storage device may determine a victim block on which to perform a garbage collection operation. For example, the victim block may be a memory block having the smallest amount of valid data, among all data, stored therein.

At operation S1403, the storage device may determine whether the number of map segments corresponding to valid data to be stored by the garbage collection operation exceeds a threshold value or not. As a result of that determination, when the number of map segments corresponding to the valid data exceeds the threshold value, the process flow proceeds to operation S1405, and otherwise, the process flow proceeds to operation S1409.

At operation S1405, the storage device may determine that the valid data to store is random data (i.e., hot data). Randomness is considered an attribute of the valid data.

At operation S1407, the storage device may store the valid data in a free block having a relatively small erase count among free blocks included in the memory device. For example, the storage device may store the valid data in a free block having the smallest erase count among the free blocks in the memory device. In another example, the storage device may store the valid data in a free block having the smallest erase count among free blocks having erase counts less than or equal to a threshold erase count among the free blocks in the memory device. In another example, the storage device may store the valid data in an arbitrary free block among free blocks having erase counts less than an average erase count of the free blocks in the memory device.

At operation S1409, the storage device may determine that the valid data to store is sequential data (i.e., cold data). Being sequential is considered an attribute of the valid data.

At operation S1411, the storage device may store the valid data in a free block having a relatively large erase count among the free blocks included in the memory device. For example, the storage device may store the valid data in a free block having the largest erase count among the free blocks in the memory device. In another example, the storage device may store the valid data in a free block having the largest erase count among free blocks having erase counts less than or equal to the threshold erase count among the free blocks in the memory device. In another example, the storage device may store the valid data in an arbitrary free block among free blocks having erase counts less than an average erase count of the free blocks in the memory device.

Figure 15:
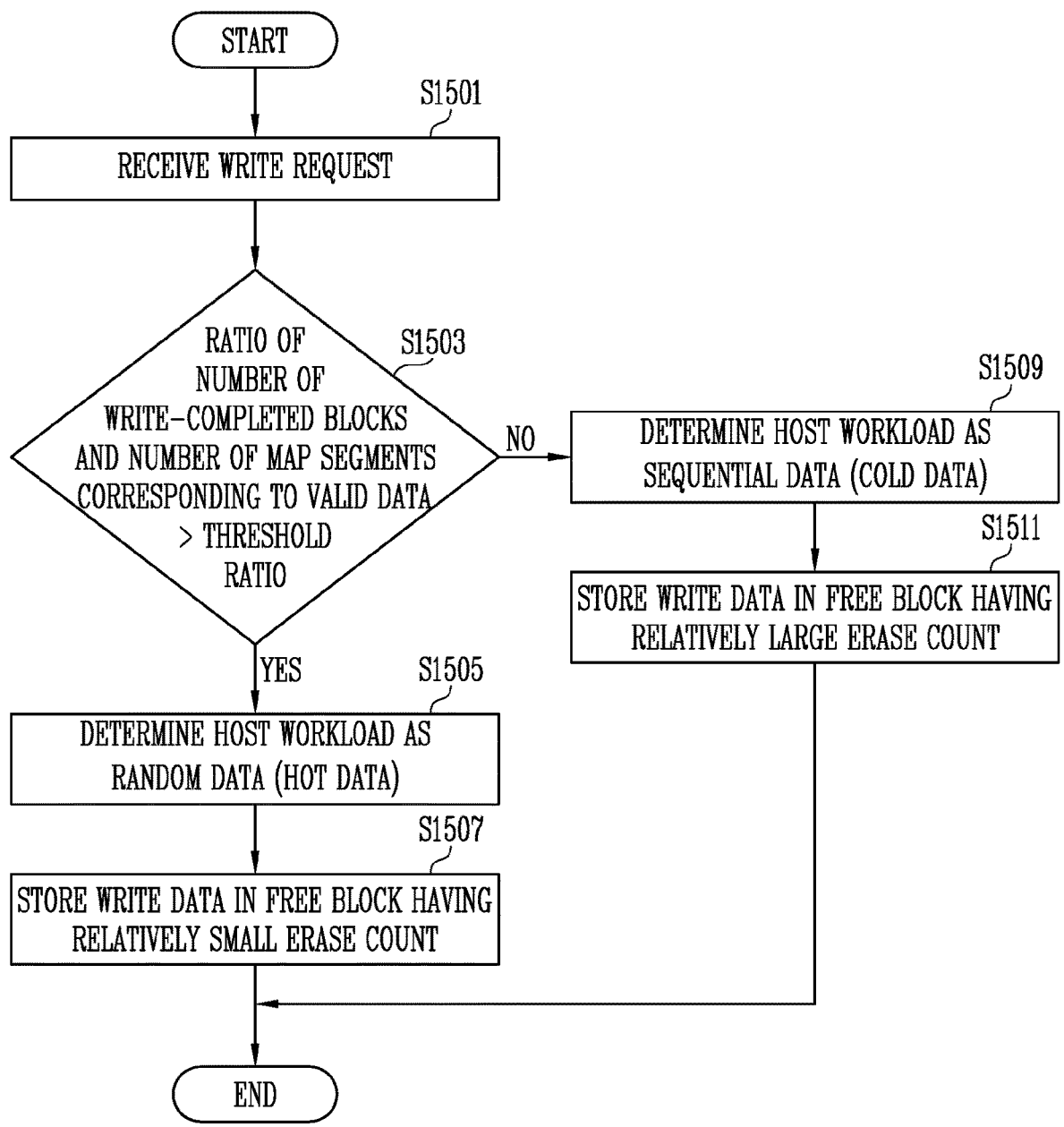
FIG. 15 is a flowchart illustrating a method of operating a storage device according to another embodiment of the present disclosure.

FIG. 15 is a flowchart illustrating a method of operating a storage device according to another embodiment of the present disclosure.

Referring to FIG. 15, at operation S1501, the storage device may receive a write request from a host.

At operation S1503, the storage device may predict workload of the host. More specifically, the storage device may predict the workload on the basis of the amount of data stored in a memory device and the number of map segments corresponding to stored valid data. For example, the storage device may determine whether a ratio of the number of write-completed blocks to the number of map segments corresponding to the valid data exceeds a threshold ratio. As a result of determination, when the ratio of the number of write-completed blocks to the number of map segments corresponding to the valid data exceeds the threshold ratio, the process flow proceeds to operation S1505, and otherwise the process flow proceeds to operation S1509.

At operation S1505, the storage device may determine the workload of the host as random data (i.e., hot data).

At operation S1507, the storage device may store write data in a free block having a relatively small erase count among free blocks included in the memory device. For example, the storage device may store the write data in a free block having the smallest erase count among the free blocks in the memory device. In another example, the storage device may store the write data in a free block having the smallest erase count among free blocks having erase counts less than or equal to a threshold erase count among the free blocks in the memory device. In another example, the storage device may store the write data in an arbitrary free block among free blocks having erase counts less than an average erase count of the free blocks in the memory device.

At operation S1509, the storage device may determine the workload of the host as sequential data (i.e., cold data).

At operation S1511, the storage device may store write data in a free block having a relatively large erase count among the free blocks included in the memory device. For example, the storage device may store the write data in a free block having the largest erase count among the free blocks in the memory device. In another example, the storage device may store the write data in a free block having the largest erase count among free blocks having erase counts less than or equal to a threshold erase count among the free blocks in the memory device. In another example, the storage device may store the write data in an arbitrary free block among free blocks having erase counts less than an average erase count of the free blocks in the memory device.

FIG. 15 illustrates determining whether the ratio of the number of write-completed blocks to the number of map segments corresponding to the valid data exceeds the threshold ratio. However, at operation S1503, the storage device may also determine whether the ratio of the number of write-completed blocks to the number of map segments corresponding to the valid data is smaller than the threshold ratio.

Figure 16:
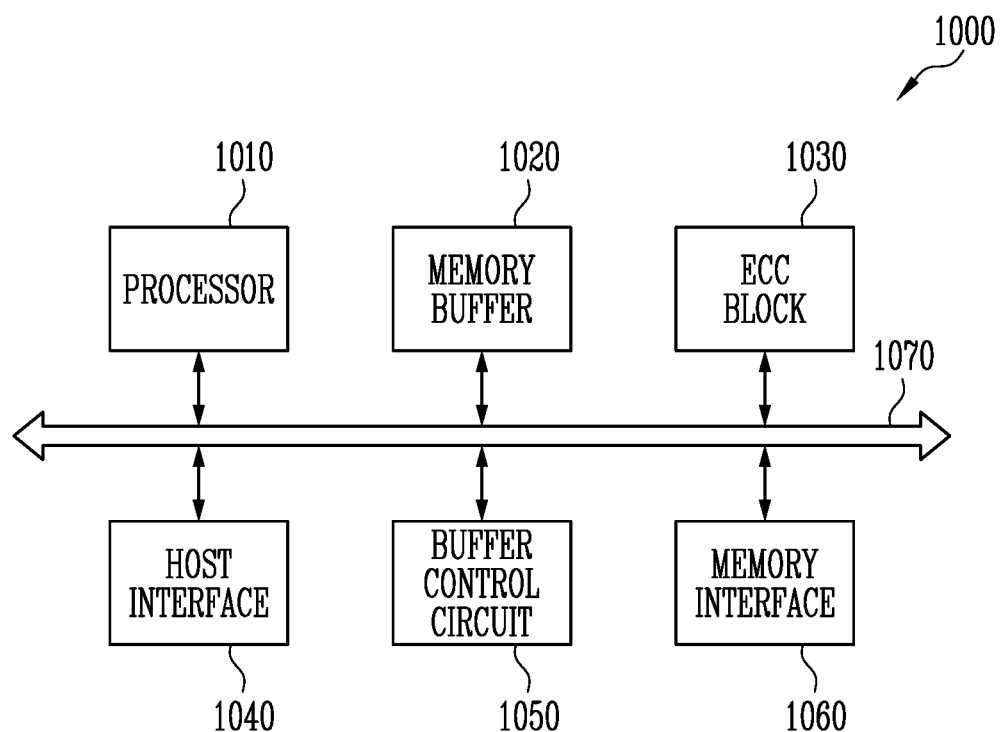
FIG. 16 is a diagram illustrating an embodiment of a memory controller, such as that shown in FIG. 1.

FIG. 16 is a diagram illustrating an embodiment of a memory controller, such as the memory controller 200 of FIG. 1.

Referring to FIG. 16, a memory controller 1000 may include a processor 1010, a memory buffer 1020, an error correction code (ECC) block 1030, a host interface 1040, a buffer control circuit 1050, a memory interface 1060, and a bus 1070. The bus 1070 may provide channels between components of the memory controller 1000.

The processor 1010 may control overall operation of the memory controller 1000 and perform a logical operation. The processor 1010 may communicate with an external host through the host interface 1040 and communicate with a memory device through the memory interface 1060. Further, the processor 1010 may communicate with the memory buffer 1020 through the buffer control circuit 1050. The processor 1010 may control operations of the storage device by using the memory buffer 1020 as a working memory, a cache memory or a buffer memory.

The processor 1010 may perform the function of the flash translation layer (FTL). The processor 1010 may translate a logical block address (LBA), provided by the host, into a physical block address (PBA) through the flash translation layer FTL. The flash translation layer FTL may receive the logical block address LBA and translate the logical block address LBA into the physical block address PBA by using a mapping table. There are various address mapping methods that the flash translation layer FTL may use, depending on a mapping unit. Typical address mapping methods include a page mapping method, a block mapping method and a hybrid mapping method.

The processor 1010 may randomize data from the host. For example, the processor 1010 may use a randomizing seed to randomize the data from the host. The randomized data may be provided, as data to be stored, to the memory device and may be programmed in the memory cell array.

The processor 1010 may run software or firmware to perform randomizing and derandomizing operations.

The memory buffer 1020 may serve as an operation memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The ECC block 1030 may perform error correction. The ECC block 1030 may perform ECC encoding based on data to be written to the memory device through the memory interface 1060. The ECC-encoded data may be transferred to the memory device through the memory interface 1060. The ECC block 1030 may perform ECC decoding based on data received from the memory device through the memory interface 1060. For example, the ECC block 1030 may be included in, as a component of, the memory interface 1060.

The host interface 1040 may communicate with the external host under the control of the processor 1010. The host interface 1040 may perform communication using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and/or Load Reduced DIMM (LRDIMM) communication methods.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In another embodiment, the memory controller 1000 may not include the memory buffer 1020 and the buffer control circuit 1050. These components may be external to, and in communication with, the memory controller 1000.

In an embodiment, the processor 1010 may control the operation of the memory controller 1000 using codes. The processor 1010 may load codes from a nonvolatile memory device (e.g., Read Only Memory) provided in the memory controller 1000. In another example, the processor 1010 may load codes from the memory device through the memory interface 1060.

For example, the bus 1070 of the memory controller 1000 may be divided into a control bus and a data bus. The data bus may be configured to transmit data in the memory controller 1000, and the control bus may be configured to transmit control information such as commands or addresses in the memory controller 1000. The data bus and the control bus may be isolated from each other, such that neither interferes with, nor influences, the other. The data bus may be coupled to the host interface 1040, the buffer control circuit 1050, the ECC block 1030, and the memory interface 1060. The control bus may be coupled to the host interface 1040, the processor 1010, the buffer control circuit 1050, the memory buffer 1020, and the memory interface 1060.

Figure 17:
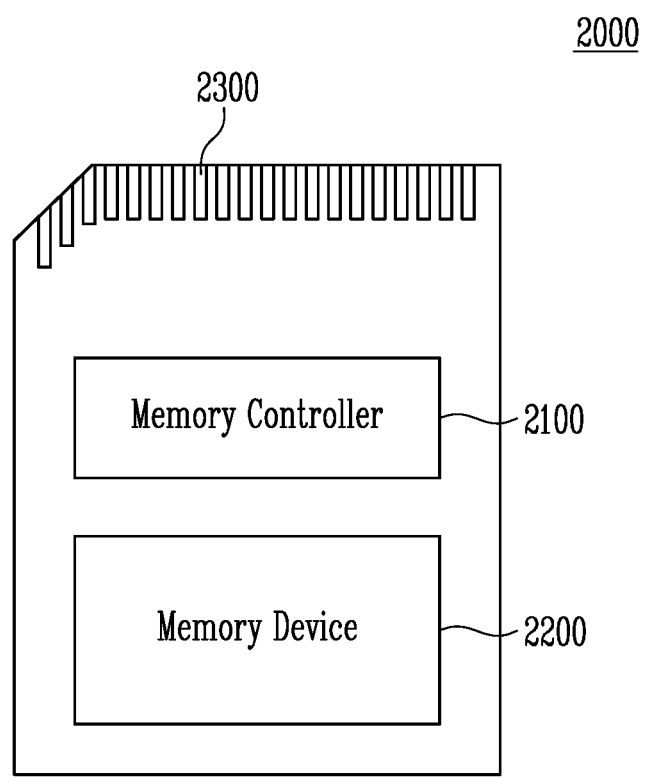
FIG. 17 is a block diagram illustrating a memory card system to which a storage device is applied according to the present disclosure.

FIG. 17 is a block diagram illustrating a memory card system 2000 to which a storage device is applied according to an embodiment.

Referring to FIG. 17, the memory card system 2000 may include a memory controller 2100, a memory device 2200, and a connector 2300.

The memory controller 2100 may be coupled to the memory device 2200. The memory controller 2100 may access the memory device 2200. For example, the memory controller 2100 may control read, write, erase, and background operations of the memory device 2200. The memory controller 2100 may be configured to provide an interface between the memory device 2200 and the host. The memory controller 2100 may be configured to drive firmware for controlling the memory device 2200. The memory controller 2100 may have the same configuration as the memory controller 200 described above with reference to FIG. 1.

In an embodiment, the memory controller 2100 may include components, such as a Random Access Memory (RAM), a processor, a host interface, a memory interface, and an ECC block.

The memory controller 2100 may communicate with an external device through the connector 2300. The memory controller 2100 may communicate with an external device (e.g., host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), WiFi, Bluetooth, and/or nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and/or a Spin Transfer Torque Magnetic RAM (STT-MRAM).

The memory controller 2100 and the memory device 2200 may be integrated into a single semiconductor device to form a memory card, such as a personal computer memory card international association (PCMCIA), a compact flash (CF) card, a smart media card (e.g., SM or SMC), a memory stick multimedia card (e.g., MMC, RS-MMC, or MMCmicro), a secure digital (SD) card (e.g., SD, miniSD, microSD, or SDHC), and/or a universal flash storage (UFS).

Figure 18:
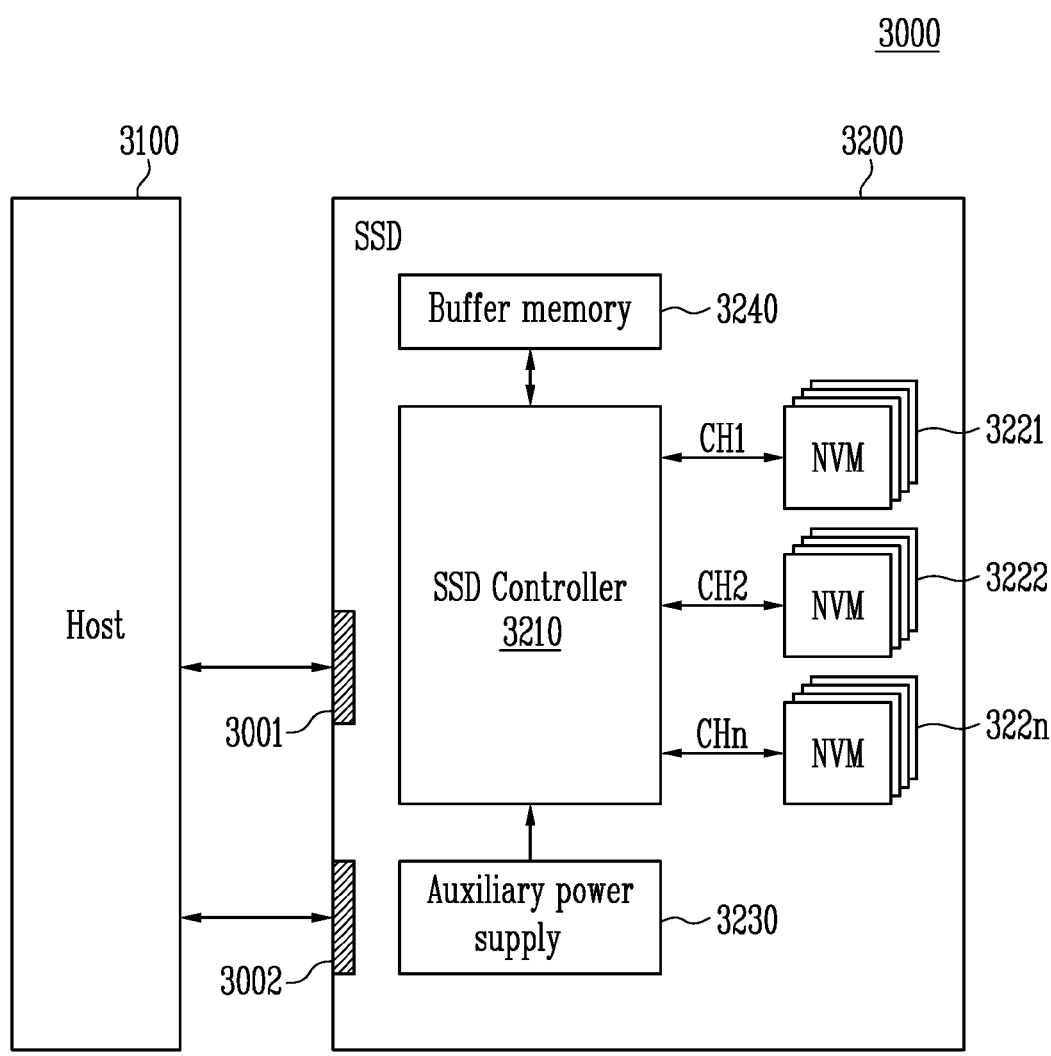
FIG. 18 is a block diagram illustrating a solid state drive (SSD) system to which a storage device is applied according to the present disclosure.

FIG. 18 is a block diagram illustrating an example of a solid state drive (SSD) system to which a storage device is applied according to an embodiment.

Referring FIG. 18, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of nonvolatile memories 3221 to 322*n*, an auxiliary power supply 3230, and a buffer memory 3240.

In an embodiment, the SSD controller 3210 may perform the function of the memory controller 200 described above with reference to FIG. 1.

The SSD controller 3210 may control the plurality of nonvolatile memories 3221 to 322*n* in response to the signals SIG received from the host 3100. In an embodiment, the signals SIG may be a signal based on the interfaces of the host 3100 and the SSD 3200. For example, the signals SIG may be defined by at least one of various interfaces such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), WiFi, Bluetooth, and/or nonvolatile memory express (NVMe) interfaces.

The auxiliary power supply 3230 may be coupled to the host 3100 through the power connector 3002. The auxiliary power supply 3230 may be supplied and charged with power PWR from the host 3100. The auxiliary power supply 3230 may supply the power of the SSD 3200 when power is not smoothly supplied from the host 3100. In an embodiment, the auxiliary power supply 3230 may be disposed within or external to the SSD 3200. For example, the auxiliary power supply 3230 may be disposed on a main board and may supply auxiliary power to the SSD 3200.

The buffer memory 3240 may function as a buffer memory of the SSD 3200. For example, the buffer memory 3240 may temporarily store data received from the host 3100 or data received from the plurality of nonvolatile memories 3221 to 322*n* or may temporarily store metadata (e.g., mapping tables) of the nonvolatile memories 3221 to 322*n*. The buffer memory 3240 may include any of various volatile memories such as DRAM, SDRAM, DDR SDRAM, LPDDR SDRAM, and GRAM, or nonvolatile memories such as FRAM, ReRAM, STT-MRAM, and/or PRAM.

Figure 19:
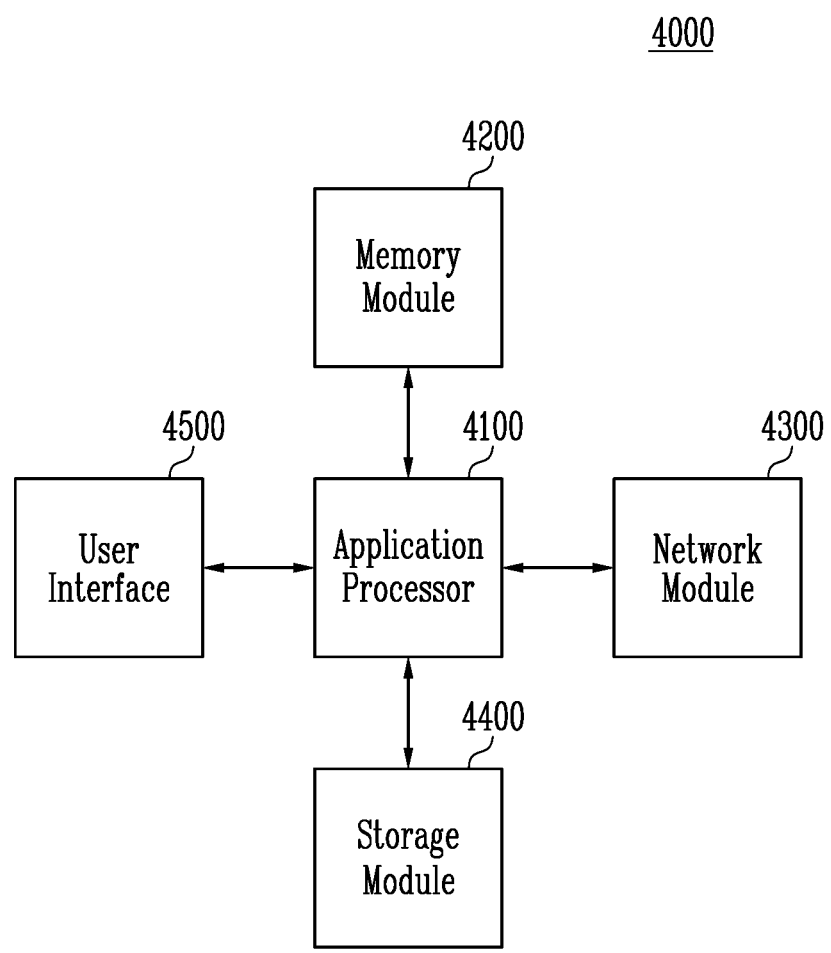
FIG. 19 is a block diagram illustrating a user system to which a storage device is applied according to the present disclosure.

FIG. 19 is a block diagram illustrating a user system 4000 to which a storage device is applied according to an embodiment of the present disclosure.

Referring to FIG. 19, the user system 4000 may include an application processor 4100, a memory module 4200, a network module 4300, a storage module 4400, and a user interface 4500.

The application processor 4100 may run components included in the user system 4000, an Operating System (OS), or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include any of various volatile RAMs such as DRAM, SDRAM, DDR SDRAM, DDR2 SDRAM, DDR3 SDRAM, LPDDR SDARM, LPDDR2 SDRAM, and LPDDR3 SDRAM or nonvolatile RAMs such as PRAM, ReRAM, MRAM, and/or FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), Wimax, WLAN, UWB, Bluetooth, or WiFi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 400.

For example, the storage module 4400 may include a plurality of non-volatile memory devices, each of which may operate in the same manner as the memory device 100 described above with reference to FIG. 1. The storage module 4400 may be operated in the same manner as the storage device 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

According to an embodiment of the present disclosure, a storage device performs wear leveling in consideration of workload. A method of operating the storage device is also provided.

In the above-discussed embodiments, not all steps need necessarily be performed; in some instances, one or more may be omitted. In addition, not all steps need necessarily be performed in the stated order; certain steps may be performed in a different order or even simultaneously. More generally, the disclosed embodiments aim to help those skilled in this art more clearly understand the present disclosure rather than to limit the bounds of the present invention. In view of the technical scope of the present disclosure, those skilled in the art to which the present disclosure pertains will be able to easily understand that various modifications can be made to any of the above-described embodiments of the present disclosure without departing from the spirit or scope of the invention. Thus, it is intended that the present invention cover all such modifications provided they come within the scope of the appended claims and their equivalents.

What is claimed is:

1. A storage device, comprising:
a memory device including write-completed blocks storing data and free blocks each containing no data; and
a memory controller controlling the memory device to perform a garbage collection operation to store valid data stored in a victim block, among the write-completed blocks, in one of the free blocks based on the number of map segments including mapping information between logical addresses and physical addresses of the valid data, and erase counts of the free blocks,
wherein the memory controller determines an attribute of the valid data stored in the victim block according to a result of comparing the number of map segments corresponding to valid data stored in the write-completed blocks with a threshold value.

2. The storage device of claim 1, wherein the memory controller comprises:
a map table including mapping information between logical addresses and physical addresses of data stored in the write-completed blocks;
block information including information about the number of map segments corresponding to valid data stored in the write-completed blocks and erase count information indicating the erase counts of the free blocks;
a block allocation controller allocating a target block to store the valid data stored in the victim block based on the attribute of the valid data and the erase count information; and
an operation controller controlling the memory device to read the valid data stored in the victim block and store the read data in the target block.

3. The storage device of claim 2, wherein the block allocation controller determines that the attribute of the valid data stored in the victim block is that the valid data is random data when the number of map segments corresponding to the valid data stored in the write-completed blocks exceeds the threshold value.

4. The storage device of claim 3, wherein the block allocation controller allocates a free block having a smallest erase count, among the free blocks, as the target block when the attribute of the valid data stored in the victim block is determined to be random.

5. The storage device of claim 3, wherein the block allocation controller allocates a free block having a smallest erase count, among free blocks having erase counts less than a threshold count, as the target block when the attribute of the valid data stored in the victim block is determined to be random.

6. The storage device of claim 2, wherein the block allocation controller determines that the attribute of the valid data stored in the victim block is that the valid data is sequential data when the number of map segments corresponding to the valid data stored in the write-completed blocks is less than or equal to the threshold value.

7. The storage device of claim 6, wherein the block allocation controller allocates a free block having a largest erase count, among the free blocks, as the target block when the attribute of the valid data stored in the victim block is determined to be sequential.

8. The storage device of claim 6, wherein the block allocation controller allocates a free block having a largest erase count, among free blocks having erase counts less than a threshold count, as the target block when the attribute of the valid data stored in the victim block is determined to be sequential.

9. The storage device of claim 6, wherein the block allocation controller calculates an average erase count of the free blocks and allocates one of free blocks having an erase count exceeding the average erase count as the target block when the attribute of the valid data stored in the victim block is determined to be sequential.

10. The storage device of claim 1, wherein the victim block is determined based on a size of the valid data stored in the write-completed blocks.

11. The storage device of claim 1, wherein the victim block is a memory block storing a least amount of valid data among the write-completed blocks.

12. A storage device, comprising:
a memory device including a plurality of memory blocks; and
a memory controller controlling the memory device to allocate a free block to store write data corresponding to a write request from a host, among free blocks each containing no data of the plurality of memory blocks, according to a size of data stored in the plurality of memory blocks and the number of map segments including mapping information between logical addresses and physical addresses of the data, and to store the write data in the free block in response to the write request, wherein the memory controller predicts workload of the host based on a ratio of the number of write-completed blocks to the number of map segments corresponding to valid data stored in the plurality of memory blocks.

13. The storage device of claim 12, wherein the memory controller comprises:
a map table including the mapping information between the logical addresses and the physical addresses of the data stored in the plurality of memory blocks;
block information including information about the number of write-completed blocks storing data, among the plurality of memory blocks, and information about the number of map segments corresponding to valid data stored in the plurality of memory blocks;
a block allocation controller allocating the free block to store the write data according to the workload; and
an operation controller controlling the memory device to store the write data in the free block.

14. The storage device of claim 13, wherein the block allocation controller determines the workload to be a random workload when the number of map segments corresponding to the valid data stored in the plurality of memory blocks divided by the number of write-completed blocks exceeds a threshold ratio.

15. The storage device of claim 14, wherein the block allocation controller allocates a free block having a smallest erase count, among the free blocks, as a memory block to store the write data in response to the random workload.

16. The storage device of claim 14, wherein the block allocation controller allocates a free block having a smallest erase count, among free blocks having an erase count less than a threshold count, as a memory block to store the write data in response to the random workload.

17. The storage device of claim 13, wherein the block allocation controller determines the workload to be a sequential workload when the number of map segments corresponding to the valid data stored in the plurality of memory blocks divided by the number of write-completed blocks is less than or equal to a threshold ratio.

18. The storage device of claim 17, wherein the block allocation controller allocates a free block having a largest erase count, among the free blocks, as a memory block to store the write data in response to the sequential workload.

19. The storage device of claim 17, wherein the block allocation controller allocates a free block having a largest erase count, among free blocks having an erase count less than a threshold count, as a memory block to store the write data in response to the sequential workload.

20. The storage device of claim 17, wherein the block allocation controller calculates an average erase count of the free blocks and allocates one of free blocks having erase counts exceeding the average erase count as a memory block to store the write data in response to the sequential workload.

* * * * *